US012689594B2

(12) United States Patent
Lee et al.

(10) Patent No.: US 12,689,594 B2
(45) Date of Patent: Jul. 21, 2026

(54) ELECTRONIC DEVICE FOR CONTROLLING AGGREGATION OF PACKET ON BASIS OF LINK CAPACITY, AND OPERATION METHOD OF ELECTRONIC DEVICE

(71) Applicant: Samsung Electronics Co., Ltd., Suwon-si (KR)

(72) Inventors: Wonbo Lee, Suwon-si (KR); Youngwook Kim, Suwon-si (KR); Youngki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 18/763,473

(22) Filed: Jul. 3, 2024

(65) Prior Publication Data

US 2024/0356859 A1     Oct. 24, 2024

Related U.S. Application Data

(63) Continuation of application No. PCT/KR2022/020465, filed on Dec. 15, 2022.

(30) Foreign Application Priority Data

Jan. 28, 2022     (KR) ........................ 10-2022-0013730
Feb. 16, 2022     (KR) ........................ 10-2022-0020442

(51) Int. Cl.
*H04L 47/43*          (2022.01)
*H04L 43/0882*       (2022.01)
*H04L 47/2475*       (2022.01)

(52) U.S. Cl.
CPC .......... *H04L 47/43* (2022.05); *H04L 43/0882* (2013.01); *H04L 47/2475* (2013.01)

(58) Field of Classification Search
CPC ..... H04L 47/2475; H04L 47/36; H04L 47/41; H04L 47/43; H04L 43/0882; H04L 43/0888; H04W 28/02
See application file for complete search history.

(56) References Cited

U.S. PATENT DOCUMENTS 7,515,538 B2     4/2009  Gefflaut et al.
10,565,002 B2     2/2020  Vincent et al.
(Continued)

FOREIGN PATENT DOCUMENTS

JP          6487979 A       3/2019
KR     10-1099447 B1     12/2011
(Continued)

OTHER PUBLICATIONS

Lee, Wonbo et al., WO-2023146130-A1—English Translation, Aug. 3, 2023 (Year: 2023).*
(Continued)

*Primary Examiner* — Jerry B Dennison
(74) *Attorney, Agent, or Firm* — Jefferson IP Law, LLP

(57)          ABSTRACT

An electronic device and an operation method of the electronic device are provided. The electronic device includes memory storing pieces of mapping data to which different maximum numbers of packets, which can be aggregated according to data throughput, are mapped according to the link capacity of a link used to receive data, the memory further storing one or more computer programs, a communication circuit, and one or more processors communicatively coupled to the memory and the communication circuit, wherein the one or more computer programs include computer-executable instructions that, when executed by the one or more processors individually or collectively, cause the electronic device to receive a plurality of packets through the communication circuit, identify the link capacity of a link used to receive the plurality of packets, select, from
(Continued)

among pieces of mapping data, mapping data corresponding to the identified link capacity, on the basis of the throughput measured while receiving the plurality of packets and the selected mapping data, determine the maximum number of some packets to be aggregated among the plurality of packets, and transmit, to a network stack, packets aggregated on the basis of the determined number.

18 Claims, 17 Drawing Sheets

(56)                    References Cited

U.S. PATENT DOCUMENTS

| | | | |
|---|---|---|---|
| 11,102,137 B2 | 8/2021 | Sung et al. | |
| 11,153,782 B2 | 10/2021 | Hwang et al. | |
| 11,330,469 B2 * | 5/2022 | Ram | H04W 28/14 |
| 11,374,881 B2 | 6/2022 | Kim et al. | |
| 11,924,114 B2 | 3/2024 | Park et al. | |
| 2011/0019557 A1 * | 1/2011 | Hassan | H04L 47/626 |
| | | | 370/252 |
| 2011/0069648 A1 * | 3/2011 | Lee | H04L 1/0003 |
| | | | 370/310 |
| 2011/0243055 A1 * | 10/2011 | Keller | H04L 1/189 |
| | | | 370/312 |
| 2012/0155518 A1 * | 6/2012 | Nakamura | H04L 47/36 |
| | | | 375/295 |
| 2016/0320967 A1 | 11/2016 | Kostic et al. | |
| 2017/0099231 A1 * | 4/2017 | Li | H04L 43/0852 |
| 2017/0171069 A1 * | 6/2017 | Oren | H04W 28/065 |
| 2018/0289713 A1 | 10/2018 | McCarthy et al. | |
| 2018/0302328 A1 * | 10/2018 | Keith | H04L 47/24 |
| 2019/0200282 A1 * | 6/2019 | Sahin | H04L 43/0882 |
| 2020/0036643 A1 * | 1/2020 | Jang | H04L 43/16 |
| 2020/0266955 A1 * | 8/2020 | Agrawal | H04W 72/542 |
| 2021/0297360 A1 * | 9/2021 | Park | H04L 47/562 |
| 2023/0072048 A1 * | 3/2023 | Kim | H04L 69/166 |
| 2024/0356859 A1 * | 10/2024 | Lee | H04L 43/0882 |

FOREIGN PATENT DOCUMENTS

| | | |
|---|---|---|
| KR | 10-2018-0081520 A | 7/2018 |
| KR | 10-2018-0092359 A | 8/2018 |
| KR | 10-2018-0118290 A | 10/2018 |
| KR | 10-2019-0125427 A | 11/2019 |
| KR | 10-2020-0007420 A | 1/2020 |
| KR | 10-2020-0017127 A | 2/2020 |
| KR | 10-2020-0114166 A | 10/2020 |
| KR | 10-2021-0129872 A | 10/2021 |
| KR | 10-2021-0137702 A | 11/2021 |
| WO | 2020/032345 A1 | 2/2020 |
| WO | 2021/230589 A1 | 11/2021 |

OTHER PUBLICATIONS

Kim, Youngwook, et al., WO-2021230589-A1—English Translation, Nov. 18, 2021 (Year: 2021).*
Park, Jongeon, et al. WO-2020032345-A1—English Translation, Feb. 13, 2020 (Year: 2020).*
International Search Report dated Mar. 13, 2023, issued in International Patent Application No. PCT/KR2022/020465.

* cited by examiner

ELECTRONIC DEVICE FOR CONTROLLING AGGREGATION OF PACKET ON BASIS OF LINK CAPACITY, AND OPERATION METHOD OF ELECTRONIC DEVICE

CROSS-REFERENCE TO RELATED APPLICATION(S)

This application is a continuation application, claiming priority under § 365 (c), of an International application No. PCT/KR2022/020465, filed on Dec. 15, 2022, which is based on and claims the benefit of a Korean patent application number 10-2022-0013730, filed on Jan. 28, 2022, in the Korean Intellectual Property Office, and of a Korean patent application number 10-2022-0020442, filed on Feb. 16, 2022, in the Korean Intellectual Property Office, the disclosure of each of which is incorporated by reference herein in its entirety.

BACKGROUND

1. Field

The disclosure relates to an electronic device and an operation method of an electronic device. More particularly, the disclosure relates to an electronic device that controls packet coalescing based on a link capacity.

2. Description of Related Art

An electronic device may receive a data packet from an external electronic device via various types of communication, and may process a data packet. The electronic device may process a packet using a protocol stack embodied in a plurality of layers. A protocol stack embodied to process a packet is embodied as a plurality of layers, and thus may perform an operation of adding a header to a packet in order to move the packet to another layer. When the number of packets to be moved to another layer is increased, a load to process movement to another layer may be increased.

In order to decrease the load, an electronic device may support a packet coalescing function (e.g., generic receive offload (GRO)), which is technique that coalesces a plurality of packets, attaches a single header to the coalesced packets, and transmits the same to a higher layer.

The above information is presented as background information only to assist with an understanding of the disclosure. No determination has been made, and no assertion is made, as to whether any of the above might be applicable as prior art with regard to the disclosure.

SUMMARY

An electronic device that supports a packet coalescing function may determine the number of packets to be coalesced based on throughput measured while receiving a packet. The electronic device may increase the number of packets to be coalesced according to increase of throughput after reception of a packet starts, so as to decrease the load of receiving and processing the coalesced packets in a network stack.

However, although a communication scheme used by the electronic device is capable of embodying higher throughput (or is capable of having a large link capacity), there may be a situation in which the electronic device configures the number of packets to coalesce to be the maximum value. When the electronic device configures the number of packets to coalesce to be the maximum value in the situation in which throughput is capable of being further increased, the electronic device may transmit a smaller number of responses (ack) than responses (ack) transmitted in the situation in which the number of packets to coalesce is relatively small, and thus may relatively slowly increase throughput.

In addition, when the electronic device does not take into consideration a link capacity (or the maximum throughput value) of a used communication scheme, the electronic device may configure the number of packets to coalesce to be small in the situation in which measured throughput is similar to the maximum throughput of the electronic device. When the electronic device configures the number of packets to coalesce to be small in the situation in which the throughput is difficult to be increased any longer, the electronic device may even increase the amount of power consumed when processing a packet.

Aspects of the disclosure are to address at least the above-mentioned problems and/or disadvantages and to provide at least the advantages described below. Accordingly, an aspect of the disclosure is to provide an electronic device and an operation method of an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes memory storing mapping data in which the maximum number of packets capable of being coalesced according to throughput of data is differently mapped based on a link capacity of a link used for receiving the data, the memory further storing one or more computer programs, a communication circuit, and one or more processors communicatively coupled to the memory and the communication circuit, wherein the one or more computer programs include computer-executable instructions that, when executed by the one or more processors individually or collectively, cause the electronic device to receive a plurality of packets via the communication circuit, identify a link capacity of a link used for receiving the plurality of packets, select mapping data corresponding to the identified link capacity among the mapping data, determine the maximum number of packets to be coalesced among the plurality of packets based on throughput measured while receiving the plurality of packets and the selected mapping data, and transmit, to a network stack, the packets coalesced based on the determined number.

In accordance with another aspect of the disclosure, an operation method performed by an electronic device is provided. The operation method includes receiving a plurality of packets, identifying a link capacity of a link used for receiving the plurality of packets, selecting mapping data corresponding to the identified link capacity among mapping data in which the maximum number of packets capable of being coalesced based on throughput of data is differently mapped based on a link capacity of a link used for receiving data, determining the maximum number of packets to be coalesced among the plurality of packets based on throughput measured while receiving the plurality of packets and the selected mapping data, and transmitting, to a network stack, the packets coalesced based on the determined number.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include receiving a plurality of packets, identifying a link capacity of a link used for receiving the plurality of packets, selecting mapping data corresponding to the identified link capacity among mapping data in which a maximum number of packets capable of being coalesced according to throughput of data is differently mapped based on a link capacity of a link used for receiving data, based on throughput measured while receiving the plurality of packets and the selected mapping data, determining a maximum number of packets to be coalesced among the plurality of packets, and transmitting, to a network stack, the packets coalesced based on the determined number.

An electronic device and an operation method of an electronic device according to various embodiments of the disclosure may determine the maximum number of packets to be coalesced based on a link capacity of a link used by the electronic device and measured throughput.

An electronic device and an operation method of an electronic device according to various embodiments of the disclosure may identify the maximum throughput at the current state of the electronic device based on history data including state information of the electronic device and the maximum throughput, and may determine the maximum number of packets to be coalesced based on the maximum throughput and measured throughput.

Therefore, the electronic device may configure the maximum number of packets to be coalesced to be relatively small in the state in which higher throughput is capable of being embodied (or the state in which a large link capacity is given), and thus may transmit a relatively large number of responses (ack), may increase transmission control protocol (TCP) responsivity, and may rapidly increase throughput. Accordingly, the electronic device may provide a communication service having low latency and/or high reception speed. In addition, the electronic device may configure the maximum number of packets to be coalesced to be relatively large in the state in which higher throughput is incapable of being embodied (or the state in which a small link capacity is given), and thus may decrease power consumed for processing packets to be coalesced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device according to an embodiment of the disclosure;

The same reference numerals are used to represent the same elements throughout the drawings.

DETAILED DESCRIPTION

Figure 2:
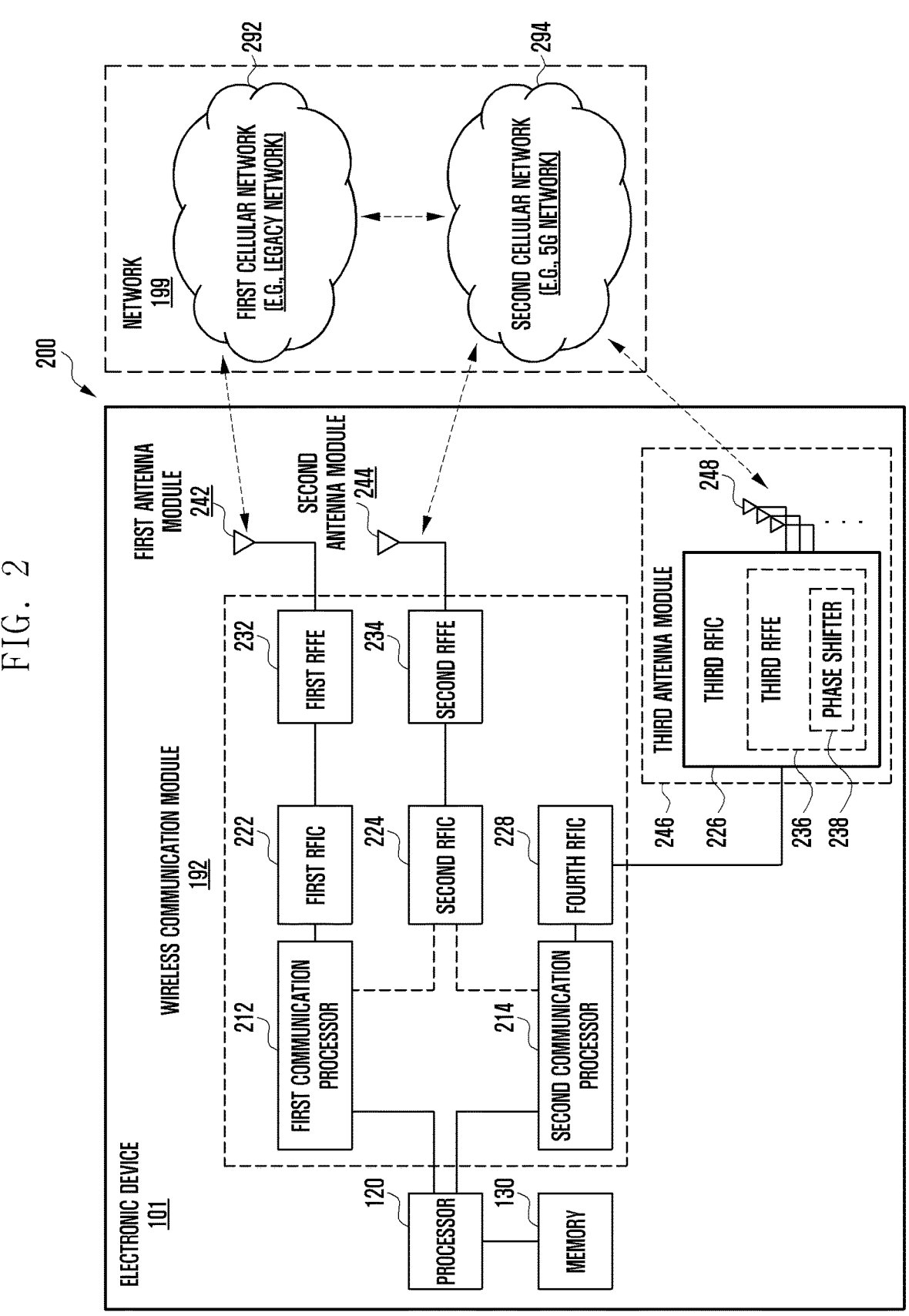
FIG. 2 is a block diagram of an electronic device for supporting legacy network communication and fifth generation (5G) network communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
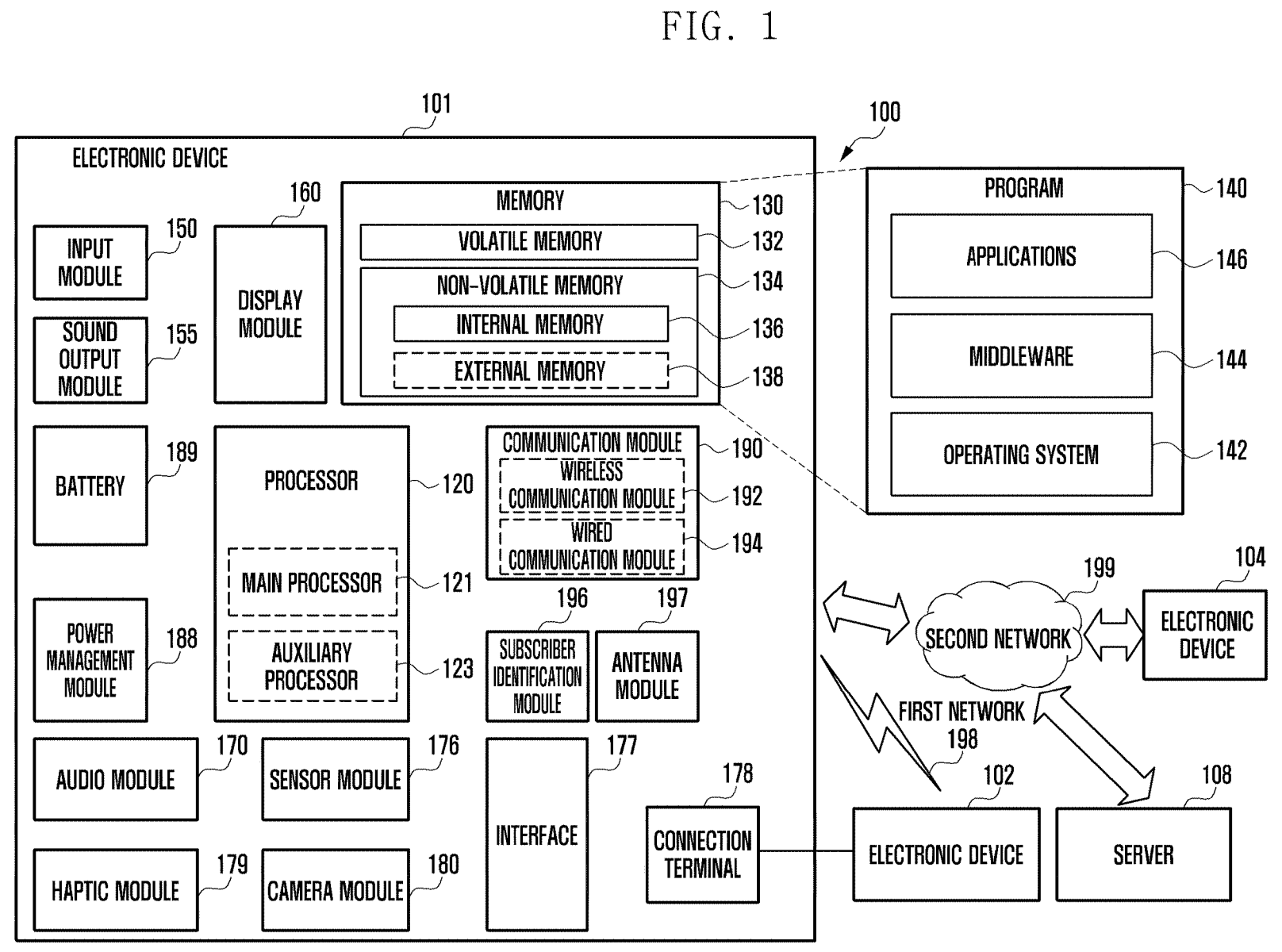

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 of an electronic device 101 for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network

292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including second generation (2G), third generation (3G), 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in third generation partnership project (3GPP). Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the subprocessor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHZ) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHZ), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFIC 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHZ) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130, and may be accessed by another component (e.g., the processor 120, the first communication processor 212, or the second communication processor 214).

Figure 3:
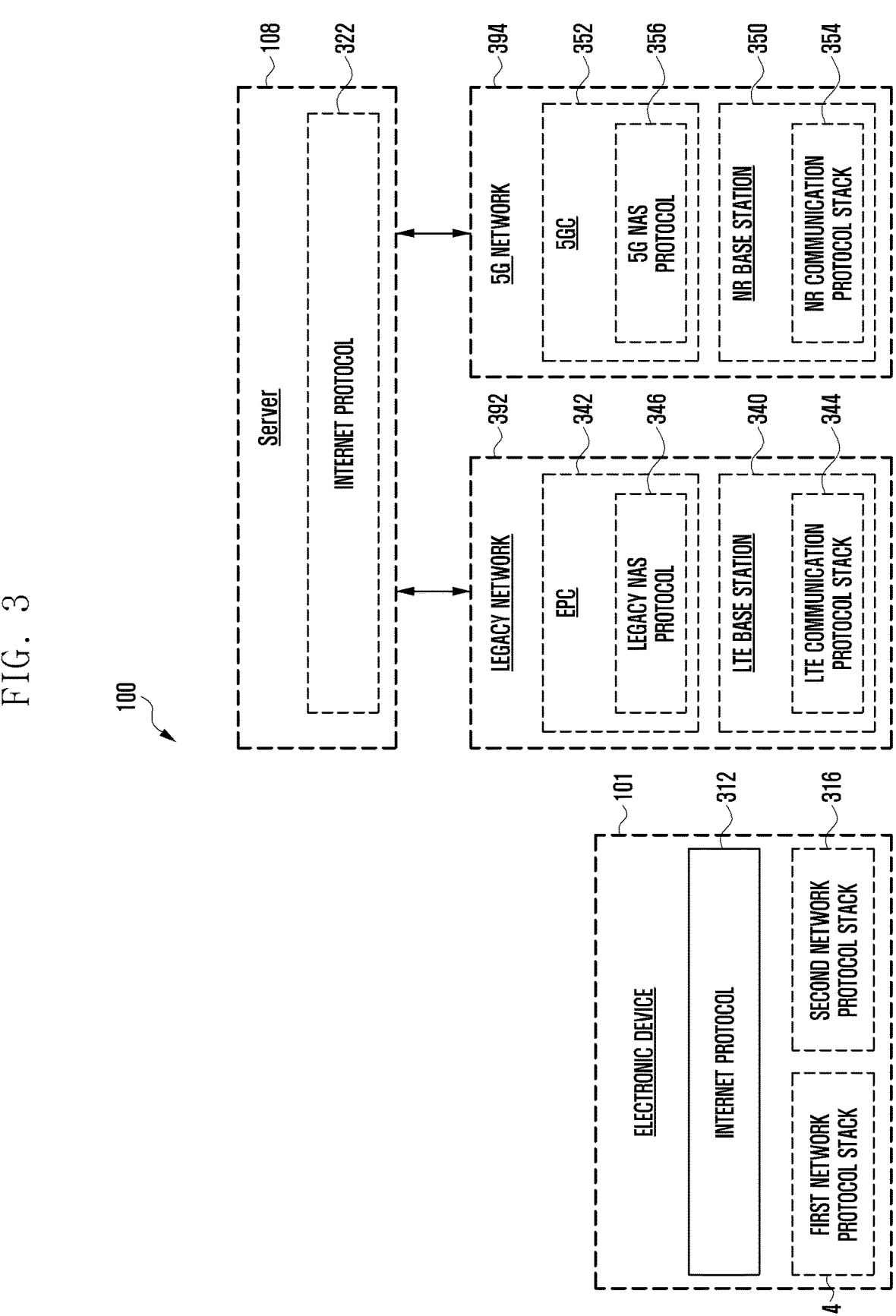
FIG. 3 is a diagram illustrating a protocol stack structure of a network 100 of legacy communication and/or 5G communication according to an embodiment of the disclosure.

FIG. 3 illustrates a protocol stack structure of the network 100 of legacy communication and/or 5G communication according to an embodiment of the disclosure.

Referring to FIG. 3, the network 100 according to an illustrated embodiment may include the electronic device 101, a legacy network 392, a 5G network 394, and the server 108.

The electronic device 101 may include an Internet protocol (IP) 312, a first communication protocol stack 314, and a second communication protocol stack 316. The electronic device 101 may communicate with the server 108 through the legacy network 392 and/or the 5G network 394.

According to an embodiment, the electronic device 101 may perform Internet communication associated with the server 108 through the Internet protocol 312 (for example, a TCP, a user datagram protocol (UDP), or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy non-access stratum (NAS) protocol 346. The legacy network 392 may perform LTE wireless communication with the electronic device 101 through the LTE communication protocol stack 344 and the legacy NAS protocol 346.

The 5G network 394 may include an NR gNB 350 and a 5G core network (5GC) 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QOS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
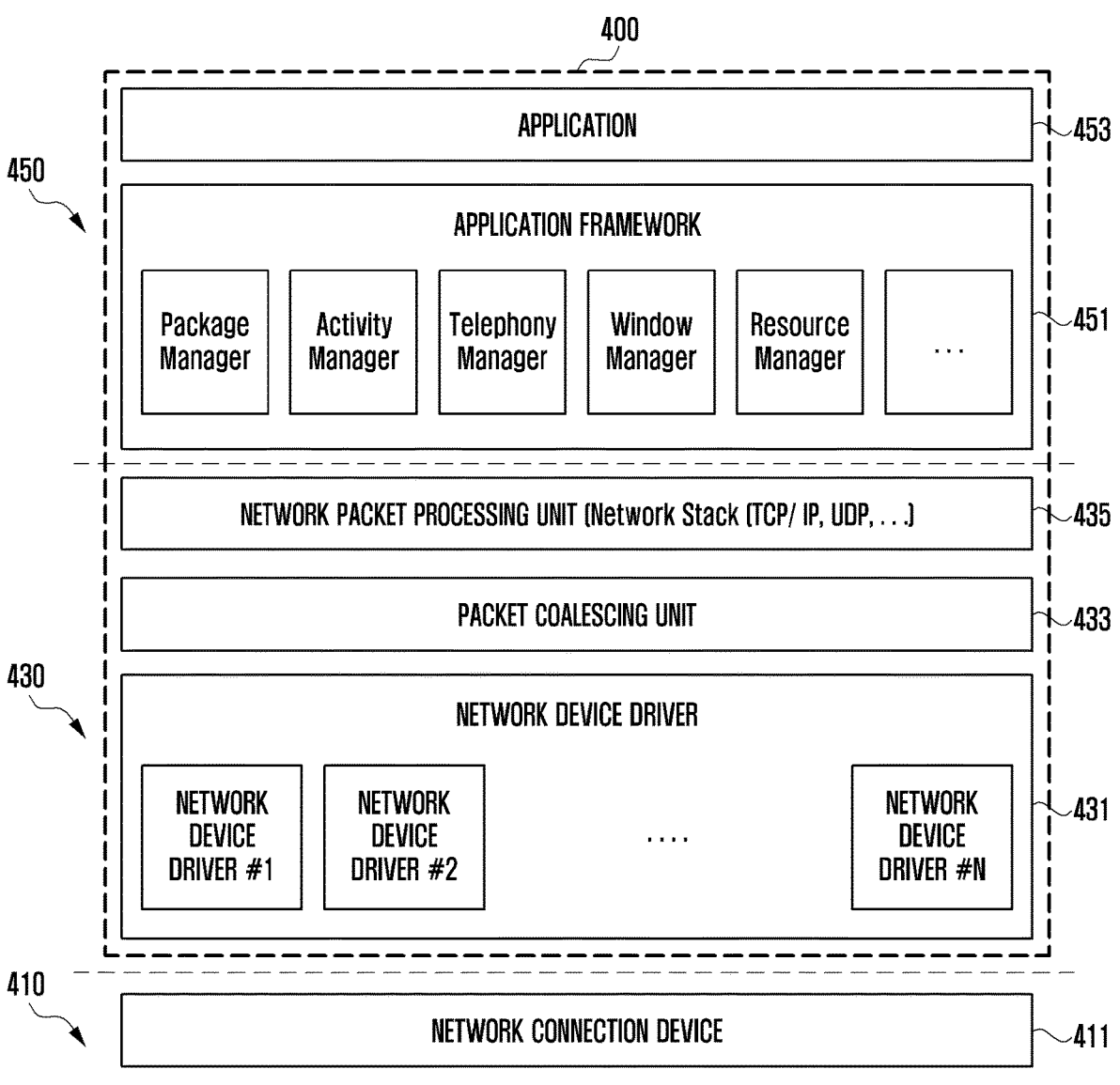
FIG. 4A is a diagram illustrating a protocol stack structure related to an operation in which an electronic device receives a plurality of packets according to an embodiment of the disclosure.

FIG. 4A is a diagram illustrating a protocol stack structure related to an operation in which an electronic device receives and processes a plurality of packets according to an embodiment of the disclosure.

Referring to FIG. 4A, an electronic device (e.g., the electronic device 101 of FIG. 1) according to various embodiments may include a device area 410 for transmitting or receiving a packet, a kernel area 430, and a user area 450. Operations performed in the kernel area 430 and the user area 450 may be implemented by a processor (e.g., the processor 120 of FIG. 1). The processor 120 may perform operations and functions in the kernel area 430 and the user area 450 by implementing software 400 (e.g., the program 140 of FIG. 1). Instructions related to the functions may be stored in memory (e.g., the memory 130 of FIG. 1).

According to various embodiments, the device area 410 is a layer in which a hardware device for transmitting or receiving a packet is included, and may perform a series of operations for transmitting or receiving a packet. The device area 410 may include a network connection device 411 (e.g., a network interface controller (NIC) or a modem). The network connection device 411 may be a hardware device for converting a packet to be transferred by the electronic device 101 via a network into a signal or a bitstream, and physically transmitting or receiving the same. A packet may include a data packet that a transmission end is to transfer to a reception end.

According to various embodiments, an application processor (AP) (e.g., the processor 120 of FIG. 1) may receive a packet via the network connection device 411 (e.g., the communication module 190 of FIG. 1), and may transmit a packet via the network connection device 411. For example, the network connection device 411 may be included in a communication processor (CP) (e.g., the sub-processor 123 of FIG. 1). Via the network connection device 411, an AP may transmit a packet to an external electronic device (e.g., the electronic device 102 or 104 of FIG. 1, or a server (e.g., the server 108 of FIG. 1)), and may receive a packet transmitted from an external electronic device or a server.

According to various embodiments, the kernel area (kernel layer) 430 may be included in an operating system (OS) (e.g., the operating system 142 of FIG. 1) of the electronic device. The kernel area (kernel layer) 430 may provide a function for controlling packet processing (or a function for controlling components included in the device area 410 connected to the kernel area 430). The kernel area (kernel layer) 430 may include various modules for processing a received packet. The kernel area 430 may include a device driver unit 431, a packet coalescing unit 433, and a network packet processing unit 435.

According to various embodiments, the device driver unit 431 may process a received packet so that the received packet is processible in a higher layer. The device driver unit 431 may process a packet to be appropriate for an operating system that currently operates in the electronic device 101. The device driver unit 431 may include one or at least two network device drivers (network device driver #1, network device driver #2, . . . , and network device driver #N). A network device driver may receive a packet according to a communication protocol defined by the manufacturer of the network connection device 411. The device drivers of network devices (e.g., a modem, a LAN card, Bluetooth, near field communication (NFC), Wi-Fi, a display, audio, and video) may be included. The network connection device 411 may produce an interrupt (e.g., hardware interrupt request (HW IRQ)), when transmitting a packet(s) to the processor 120. A network device driver may receive packets together with an interrupt. Each network device driver may process received packets into structures. The structures may be stored in a buffer for network processing. The buffer may be configured in the form of a list for a packet coalescing function described below.

According to various embodiments, the packet coalescing unit 433 may perform a packet coalescing function. The packet coalescing unit 433 may transfer received packets to a higher layer (e.g., the network packet processing unit 435). The packet coalescing unit 433 may transfer structuralized packets received from the device driver unit 431 to a higher layer. The packet coalescing unit 433 may coalesce received packets and deliver the same. The packet coalescing function is a scheme that coalesces (or binds) packet data (or consecutive packet data having the same IP/TCP header information) received via the same session into a single packet, and transfers the coalesced packets to a network stack. The coalesced packets may have a single header. The packet coalescing unit 433 may coalesce received packets, and may transfer the same to a higher layer at the same time, thereby reducing the load of the network packet processing unit 645. For example, the network packet processing unit 645 may receive the coalesced packets, and may process the header of the coalesced packets, thereby reducing the load of processing the header of each of a plurality of packets when receiving the plurality of packets. Alternatively, via the packet coalescing function, the number of responses (e.g., acknowledge (ACK)) to received packets is decreased, and thus the load of the network connection device 411 may be reduced. Alternatively, as the overall load in a system is decreased, throughput efficiency may be increased. Accordingly, throughput (Tput) may be increased.

According to various embodiments, the packet coalescing unit 433 may immediately deliver received packets to a higher layer (e.g., a transmission control protocol (TPC)/ Internet protocol (IP)). If a notification indicating that reception of packets is complete is received, or a predetermined condition is satisfied, the packet coalescing unit 433 may immediately transfer the received packets to a higher layer.

According to various embodiments, the operation in which the packet coalescing unit 433 coalesces received packets and transmits the coalesced packets to a higher layer, or immediately transfers received packets to a higher layer, may be referred to as "flush". Flush refers to an operation of transferring structures stored in a buffer of the packet coalescing unit 433 to a higher layer (e.g., the network packet processing unit or network stack 435). The packet coalescing unit 433 may store structures in the form of a list in the buffer in a manner that the structures correspond to a stream (e.g., a TPC stream). The packet coalescing unit 433 may include a packet list corresponding to each stream.

According to various embodiments, the packet coalescing function may also be referred to as "offload", "receive offload", or "generic receive offload". The packet coalescing function may be performed as a function defined in the OS that currently operates in the electronic device 101. For example, the packet coalescing function may include generic receiver offload (GRO) of Linux™. As another example, the packet coalescing function may be a receive segment coalescing (RSC) of Windows™.

According to various embodiments, the network packet processing unit 435 may process a packet received from the packet coalescing unit 433. The network packet processing unit 435 may include a network stack. The network packet processing unit 435 may include a network layer (e.g., an internet protocol (IP) or an internet control message protocol (ICMP)) and a transport layer (a transmission control protocol (TCP) or a user datagram protocol (UDP)). The network packet processing unit 435 may receive a packet from the network connection device 411 via the device driver unit 431 and the packet coalescing unit 433. The network packet processing unit 435 may process a received packet so that the received packet is processible in a user area, and may transfer the processed packet to the user area. For example, in the IP layer, the network packet processing unit 435 may perform IP routing. In addition, for example, in the TCP layer, the network packet processing unit 435 may identify a TCP control block. The network packet processing unit 435 may identify the IP and the port number of a corresponding packet.

According to various embodiments, in the user area (user layer) 450, operations that use packets transferred from the kernel area 430 may be performed. In the user area (user layer) 450, transferred packets may be used appropriately for the purpose of applications that operate in the user layer. For example, a message may be displayed to a user of the electronic device 101, or a video streaming service may be provided. The user area 450 may include an application framework 451 and applications 453.

According to various embodiments, the applications 453 may operate in an operating system (e.g., the operating system 142 of FIG. 1) for controlling resources related to the electronic device and/or an operating system. The application framework 451 may provide a function required by the applications 453 in common, or may provide various functions to the applications 453 to enable the applications 453 to use the limited system resources within the electronic device.

According to various embodiments, packets received from the network connection device 411 may be transferred, via the device driver unit 431 of the software 400 (e.g., the program 140 of FIG. 1), to the packet coalescing unit 433 and the network stack 435, and applications may use packets processed in the network stack.

According to various embodiments, the packet coalescing function provided in the packet coalescing unit 433 may bind multiple received packets into one entity and may transfer the same to the network stack at the same time, thereby reducing the processing load of the network stack 435. A maximum transmission unit (MTU) may be the maximum transmission unit of a packet that is capable of being transmitted to a network layer (e.g., the IP layer of the network stack). In the case in which a packet coalescing function is not applied, a network device driver may transfer a packet, having a size less than or equal to the MTU, to the network stack. In the case in which the packet coalescing function is applied, the size of a packet flushed to the network stack may exceed the maximum transmission unit (MTU). If the packet coalescing function is applied, the load of the network stack 435 of the system may be reduced, and responses (ACK) to a smaller number of packets may be transferred to a server, and thus the load of the network connection device 411 (e.g., data transmission hardware such as an NIC or a modem, and all network processors) may be reduced. However, when the packet coalescing unit 433 indiscriminately coalesces packets and transfers the same to a higher layer, the network speed may not be promptly increased in the case in which the network speed is low (e.g., initial packet transmission).

According to various embodiment, a transmission protocol, such as TCP, may increase the size of a window (or the number of packets to be transmitted) every time that an ACK is received for congestion control. For example, at an initial transmission, the transmission protocol may exponentially increase a window size every time that an ACK is received, until the window size exceeds a threshold value. For example, at the initial transmission, as a response to a transmitted packet is provided quicker, a network speed may be increased faster. However, in the case in which a small number of responses (ACK) is transmitted, an increasing rate of the network speed may be decreased. For example, in the case in which an ACK is transmitted once for a plurality of packets which are coalesced, as opposed to transmitting an ACK for each received packet, a transmission end may increase the size of a window in consideration of the ACK transmitted once. In the case in which a packet coalescing function is applied, the number of times that an ACK is produced may be reduced, and thus throughput may be lower than the case in which the packet coalescing function is not applied. As a network condition is better, the number of times that an ACK is produced is increased, and thus throughput may be decreased via the packet coalescing function.

By taking into consideration the above-described phenomenon, the electronic device 101 may determine the maximum number of packets to coalesce based on throughput measured while receiving a plurality of packets. According to an embodiment, as measured throughput is increased, the electronic device 101 may increase the maximum number of packets to coalesce. For example, the electronic device 101 may determine the maximum number of packets to coalesce with reference to the mapping data listed in Table 1 below.

TABLE 1

| Throughput | Maximum number of packets to coalesce |
|---|---|
| Throughput ≤ 50 Mbps | 2 |
| 50 Mbps < Throughput ≤ 100 Mbps | 8 |
| 100 Mbps < Throughput ≤ 150 Mbps | 16 |
| 150 Mbps < Throughput ≤ 200 Mbps | 24 |
| 200 Mbps < Throughput | 46(Maximum value) |

By taking into consideration the above-described phenomenon, the electronic device 101 may determine the maximum value of a flush time based on throughput measured while receiving a plurality of packets. According to an embodiment, as the measured throughput is increased, the electronic device 101 may increase a flush time in order to increase the maximum number of packets to coalesce. For example, the electronic device 101 may determine a flush time with reference to the mapping data listed in Table 2 below.

TABLE 2

| Throughput | Flush time |
|---|---|
| Throughput ≤ 50 Mbps | 10 μs |
| 50 Mbps < Throughput ≤ 100 Mbps | 50 μs |
| 100 Mbps < Throughput ≤ 150 Mbps | 100 μs |
| 150 Mbps < Throughput ≤ 200 Mbps | 200 μs |
| 200 Mbps < Throughput | 300 μs (Maximum value) |

The above-described embodiment determines the number of packets to coalesce based on measured throughput without considering the characteristics of a communication scheme used by the electronic device 101.

In this instance, when the electronic device 101 does not take into consideration a link capacity (or the maximum throughput value) of a used communication scheme, the electronic device 101 may configure the number of packets to coalesce to be a maximum number in the situation in which the electronic device 101 is capable of embodying higher throughput. When the electronic device 101 configures the number of packets to coalesce to be the maximum value in the situation in which throughput is capable of being further increased, the electronic device 101 may transmit a smaller number of responses (ack) than responses (ack) transmitted in the situation in which the number of packets to coalesce is relatively small, and thus may relatively slowly increase the throughput.

In addition, when the electronic device 101 does not take into consideration a link capacity (or the maximum throughput value) of a used communication scheme, the electronic device 101 may configure the number of packets to coalesce to be small in the situation in which measured throughput is similar to the maximum throughput of the electronic device 101. When the electronic device 101 configures the number of packets to coalesce to be small in the situation in which the throughput is difficult to be increased any longer, the electronic device 101 may even increase the amount of power consumed when processing a packet.

Figure 4B:
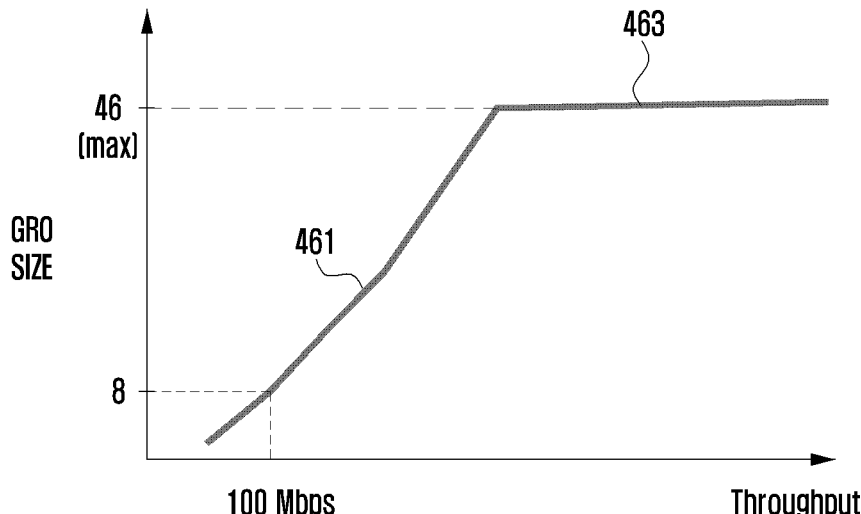
FIG. 4B is a graph illustrating the number of packets that are coalesced as throughput is increased in an electronic device according to an embodiment of the disclosure.

FIG. 4B is a graph illustrating the number of packets thar are coalesced as throughput is increased in an electronic device according to an embodiment of the disclosure.

An electronic device (e.g., the electronic device 101 of FIG. 1) may determine the maximum number of packets to be coalesced with reference to the mapping data listed in Table 1.

The electronic device 101 may increase the number of packets to be coalesced in the state in which measured throughput is increased as shown in line 461. In the case in which measured throughput is greater than or equal to a designated value (e.g., 300 Mbps), the electronic device 101 may configure the maximum number of packets to be coalesced to be a designated value (e.g., 46) as shown in line 463. The electronic device 101 may maintain the maximum number of packets to be coalesced although measured throughput is further increased.

When the electronic device 101 determines the maximum number of packets to be coalesced only in consideration of a single piece of mapping data in which measured throughput and the maximum number of packets to be coalesced are mapped, without taking into consideration a link capacity (or the maximum throughput value) of a communication scheme used by the electronic device 101, various problems may be incurred which will be described in detail below.

Figure 4C:
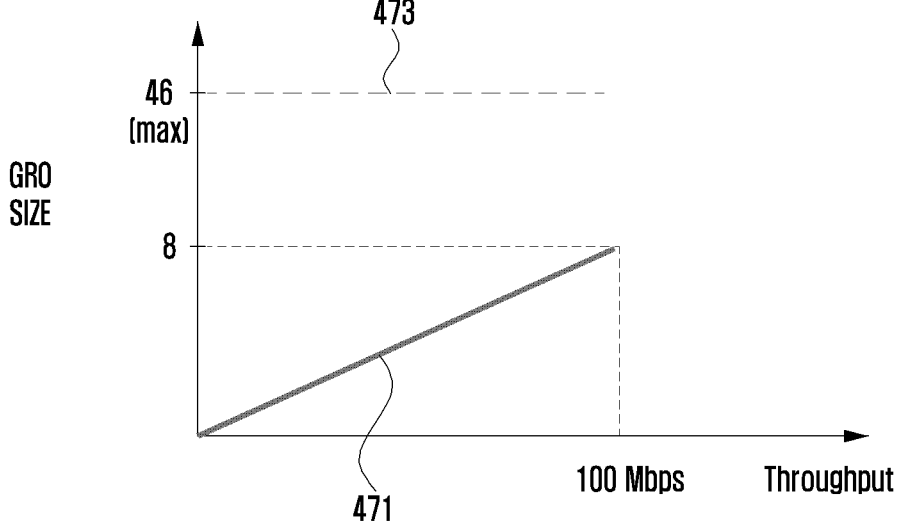
FIG. 4C is a graph illustrating the number of packets thar are coalesced as throughput is increased in an electronic device according to an embodiment of the disclosure.

FIG. 4C is a graph illustrating the number of packets thar are coalesced as throughput is increased in an electronic device according to an embodiment of the disclosure.

It is assumed that an electronic device (e.g., the electronic device 101 of FIG. 1) determines the number of packets to be coalesced with reference to the mapping data listed in Table 1, and the electronic device 101 transmits or receives a packet via wireless communication using long term evolution (LTE).

As shown in line 471, the electronic device 101 may increase the number of packets to be coalesced in the state in which measured throughput is increased.

The maximum throughout that the electronic device 101, which supports LTE, is capable of embodying via LTE may be, for example, approximately 100 Mbps. When throughput measured in the state in which the electronic device 101 receives a packet is similar to the maximum throughput as shown in line 473, the electronic device 101 may coalesce eight packets with reference to mapping data as shown in Table 1, and may transmit (or flush) the coalesced packets to a network stack (e.g., the network packet processing unit 435 of FIG. 4A). In this instance, although it is incapable of increasing throughput any longer, the electronic device 101 may configure the number of coalesced packets (e.g., 8) to be lower than the maximum number of the packets capable of being coalesced (e.g., 46), and thus may fail to reduce the amount of power consumed for packet processing, which could be achieved by increasing the number of coalesced packets.

Figure 4D:
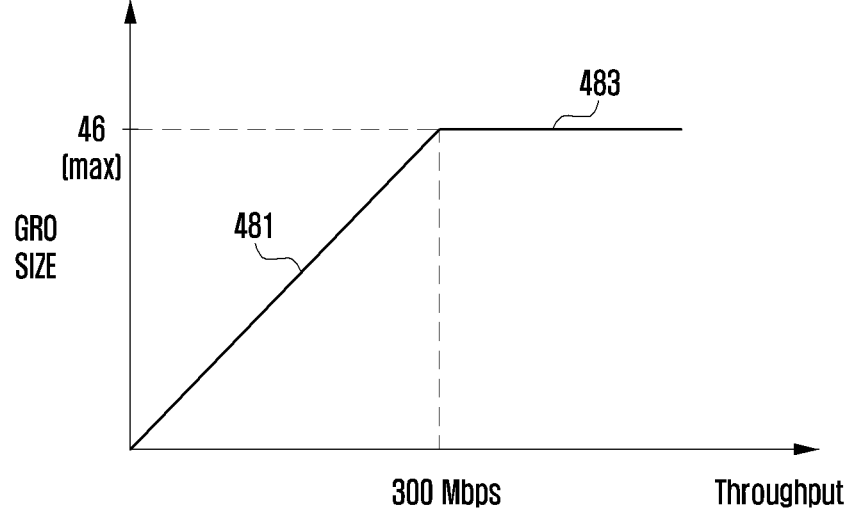
FIG. 4D is a graph illustrating the number of packets thar are coalesced as throughput is increased in an electronic device according to an embodiment of the disclosure.

FIG. 4D is a graph illustrating the number of packets that are coalesced as throughput is increased in an electronic device according to an embodiment of the disclosure.

It is assumed that an electronic device (e.g., the electronic device 101 of FIG. 1) determines the number of packets to be coalesced with reference to the mapping data listed in Table 1, and the electronic device 101 transmits or receives a packet via wireless communication using NR (new radio).

As shown in line 481, the electronic device 101 may increase the number of packets to be coalesced in the state in which measured throughput is increased. Based on identifying that measured throughput is greater than or equal to (or exceed) a designated value (e.g., 300 Mbps), the electronic device 101 may configure the number of packets to be coalesced to be the maximum value (e.g., 46) with reference to mapping data as shown in Table 1. As shown in line 483, in the case in which the measured throughput is greater than or equal to the designated value, the electronic device 101 may maintain the number of packets to be coalesced as the maximum value. The electronic device 101 may coalesce 46 packets, and may transmit (or flush) the coalesced packets to a network stack (e.g., the network packet processing unit 435 of FIG. 4A).

In this instance, the maximum throughput that the electronic device 101, which supports NR, is capable of embodying via wireless communication may be approximately 1 Gbps. In the state in which the throughput (e.g., 300 Mbps) measured by the electronic device 101 is smaller than the maximum throughput, although the throughput is capable of being further increased, there may be a situation in which the electronic device 101 configures the number of packets to coalesce to be the maximum value. When the electronic device 101 configures the number of packets to coalesce to be the maximum value in the situation in which throughput is capable of being further increased, the electronic device 101 may transmit a smaller number of responses (ack) than responses (ack) transmitted in the situation in which the number of packets to coalesce is relatively small, and thus may decrease TCP responsivity and may relatively slowly increase the throughput.

Hereinafter, a description is provided in association with embodiments that adaptively adjust the number of packets to be coalesced based on the state of a network to which the electronic device 101 is connected, and the state information of the electronic device 101, so as to embody the reduction of the amount of power consumed and rapid increase of throughput.

Figure 5:
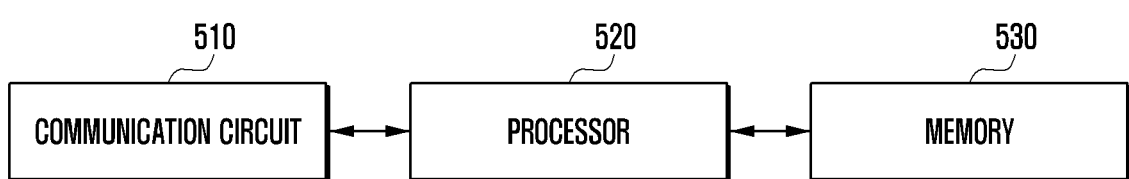
FIG. 5 is a block diagram of an electronic device according to an embodiment of the disclosure.

FIG. 5 is a block diagram of an electronic device according to an embodiment of the disclosure.

Referring to FIG. 5, an electronic device (e.g., the electronic device 101 of FIG. 1) according to various embodiments of the disclosure may include a communication circuit 510 (e.g., the wireless communication module 192 of FIG. 1 and the network connection device 411 of FIG. 4A), a processor 520 (e.g., the processor 120 of FIG. 1), and/or memory 530 (e.g., the memory 130 of FIG. 1).

The communication circuit 510 may perform data transmission or reception via wireless communication. The communication circuit 510 may be a communication circuit that supports one communication scheme between a short-range wireless communication scheme or a cellular communication scheme. The short-range wireless communication may be other wireless communication excluding cellular communication. For example, the short-range wireless communication may be a communication scheme that transmits or receives data via various types of wireless networks including Wi-Fi. The cellular communication may be communication that transmits or receives data via a base station. For example, the cellular communication may be $4^{th}$ generation mobile communication (long term evolution (LTE)), $5^{th}$ generation mobile communication (new radio (NR)), or various types of mobile communication that may be developed thereafter.

The processor 520 may be operatively connected to the communication circuit 510, so as to control operation of the communication circuit 510. The processor 520 may receive a packet transmitted from an external electronic device (e.g., the electronic device 104 of FIG. 1) via the communication circuit 510, may process the received packet via various entities (e.g., the network packet processing unit 435 of FIG. 4A), and may perform various services using the processed packet. For example, the processor 520 may output data obtained using the processed packet via a display (e.g., the display module 160 of FIG. 1) or a speaker (e.g., the audio module 170 of FIG. 1).

The processor 520 may perform a series of operations of establishing a session for performing transmission and/or reception of various packets with the external electronic device 104. A session may be a physical or logical connection for packet transmission and/or reception between the electronic device 101 and the external electronic device 104. The session between the electronic device 101 and the external electronic device 104 may be produced via various schemes (e.g., TCP, UDP) not limited by the disclosure. The processor 520 may control the communication circuit 510 for various operations for establishing a session.

Upon completion of session establishment, the processor 520 may control the communication circuit 510 so as to transmit a packet to the external electronic device 104, or to receive a packet transmitted from the external electronic device 104. The processor 520 may measure (or monitor) throughput associated with packet reception while receiving a packet transmitted from the external electronic device 104.

The processor 520 may receive a packet transmitted from the external electronic device 104 via the communication circuit 510, and may process the received packet via various entities (e.g., the packet coalescing unit 433 and the network packet processing unit 435 of FIG. 4A) embodied to be stratified in the processor 520. When transmitting the received packet to the network packet processing unit 435, the processor 520 may coalesce some of a plurality of packets by using a packet coalescing function provided by the packet coalescing unit 433, and may transmit the coalesced packets to the network packing processor (or a network stack) 435.

Upon reception of the coalesced packets, the processor 520 may control the network packet processing unit 435 so as to process the coalesced packets, and may control the communication circuit 510 so as to transmit a response (ack) indicating that the packet is received to the external electronic device 104. The external electronic device 104 may receive a response transmitted from the electronic device 101, and may increase the number of packets to be transmitted to the electronic device 101 (or the size of a packet or the size of a window) in response to reception of the response. The external electronic device 104 may increase the number of packets to be transmitted to the electronic device 101 when the number of responses transmitted by the electronic device 101 is increased.

While receiving a plurality of packets, the processor 520 may identify a link capacity of a link used for receiving the plurality of packets. The link capacity may be the maximum capacity capable of performing transmission (or reception) via a link established for packet transmission and/or reception between the electronic device 101 and the external electronic device 104. The link capacity may be a value associated with the maximum throughput of a communication scheme used by the electronic device 101 for packet reception. The link capacity may be large when the maximum throughput of a communication scheme used by the electronic device 101 for packet reception is high. The link capacity may be small when the maximum throughput of a communication scheme used by the electronic device 101 for packet reception is low. For example, a link capacity corresponding to the case in which the electronic device 101 receives a packet via LTE may be smaller than a link capacity corresponding to the case in which the electronic device 101 receives a packet via NR. The processor 520 may identify the maximum throughput of a link (or wireless communication) to which the electronic device 101 is currently connected, instead of a link capacity.

With reference to mapping data including a link capacity and network information (e.g., network identification information (e.g., LTE, NR, Wi-Fi), information related to the frequency of a channel (e.g., a frequency, a bandwidth), a signal intensity (e.g., reference signals received power (RSRP)) mapped therein and stored in the memory 530, the processor 520 may identify a link capacity. For example, the mapping data may be expressed as shown in Table 3 below.

TABLE 3

| Network information | Frequency band and bandwidth | Quality of signal (e.g., RSRP) | Link capacity |
| --- | --- | --- | --- |
| LTE | 3 Ghz, 20 MHz | −110 dBm | 150 Mbps |
| NR | 6 GHz, 60 Mhz | −80 dBm | 1.5 Gbps |
| Wi-Fi | 5 GHz, 20 Mhz | −125 dBm | 500 Mbps |
| Bluetooth | 2.4 GHz, 20 Mhz | −130 dBm | 30 Mbps |

With reference to the mapping data illustrated in Table 3, a link capacity may be mapped to network information (e.g., network identification information (e.g., LTE, NR, Wi-Fi), information related to the frequency of a channel (e.g., a frequency, a bandwidth), a signal intensity (e.g., RSRP)). In this instance, characteristics mapped to a link capacity in the disclosure may include various characteristics in addition to the network information, the information related to the frequency of a channel, and/or signal intensity. For example, the mapping data may be configured so that at least one of a block error rate (BLER) or a channel quality indicator (CQI) is mapped to a link capacity. The mapping data may be configured so that a link capacity is increased when a BLER is decreased (or a CQI is increased). The mapping data may be configured so that a link capacity is mapped to a UE-related characteristic, in addition to a network-related characteristic.

The processor 520 may identify identification information of a network used for packet transmission or reception performed with the external electronic device 104, and may identify a link capacity corresponding to the identified identification information with reference to mapping data.

As a part of an operation of identifying a link capacity, the processor 520 may request information related to a link capacity from a communication processor (e.g., the first communication processor 212 and/or the second communication processor 214 of FIG. 2) in a process that establishes a session for receiving a plurality of packets (e.g., establishment of a TCP/UDP connection) and/or a process of changing a network accessed (e.g., changing of a radio access network, establishing/changing of a PDU session or packet data network (PDN) connection, or the like). Based on link capacity-related information transmitted from the communication processor 212 and 214, the processor 520 may identify a link capacity.

As a part of an operation of identifying a link capacity, the processor 520 may identify a link capacity based on information (e.g., an aggregate maximum bit rate (AMBR) defined in 3GPP TS 23.501 and/or a maximum flow bit rate (MFBR) defined in 3GPP TS 24.501) received from a network in a process of establishing a session for receiving a plurality of packets and/or a process of changing a network accessed.

The processor 520 may determine, as a link capacity (or the maximum throughput), the smallest value among a link capacity identified based on mapping data stored in the memory 130, a link capacity identified based on link capacity-related information transmitted by the processor 212 and 214, and/or a link capacity identified based on information received from the network, and may determine the maximum number of packets to be coalesced. The processor 520 may determine the maximum number of packets to be coalesced based on throughput measured during packet reception and the link capacity.

In order to determine the maximum number of packets to be coalesced, the processor 520 may refer to the mapping data stored in the memory 130. The mapping data may be data in which the throughput of data and the maximum number of packets capable of being coalesced are mapped. The mapping data may be embodied differently depending on a link capacity. For example, the memory 130 may store mapping data to which reference may be made in the case of a link capacity of 150 Mbps and mapping data to which reference may be made in the case of a link capacity of 1.5 Gbps.

The mapping data may be configured so that a degree of increase of the maximum number of packets capable of being coalesced according to increase of throughput is relatively decreased as the link capacity is increased. For example, the mapping data to which reference may be made in the case of a link capacity of 150 Mbps may be embodied as shown in Table 4, and the mapping data to which reference may be made in the case of a link capacity of 1 Gbps may be embodied as shown in Table 5.

TABLE 4

| Throughput | Maximum number of packets capable of being coalesced |
| --- | --- |
| throughput ≤ 10 Mbps | 3 |
| 10 Mbps < throughput ≤ 30 Mbps | 9 |
| 30 Mbps < throughput ≤ 50 Mbps | 15 |
| 50 Mbps < throughput ≤ 70 Mbps | 21 |
| 70 Mbps < throughput ≤ 100 Mbps | 31 |
| 100 Mbps < throughput ≤ 150 Mbps | 46 |

TABLE 5

| Throughput | Maximum number of packets capable of being coalesced |
| --- | --- |
| throughput ≤ 100 Mbps | 4 |
| 100 Mbps < throughput ≤ 200 Mbps | 8 |
| 200 Mbps < throughput ≤ 300 Mbps | 12 |

TABLE 5-continued

| Throughput | Maximum number of packets capable of being coalesced |
|---|---|
| 300 Mbps < throughput ≤ 500 Mbps | 22 |
| 500 Mbps < throughput ≤ 800 Mbps | 36 |
| 800 Mbps < throughput ≤ 1000 Mbps | 46 |

The mapping data to which reference is made in the case of a link capacity of 150 Mbps may be configured so that the maximum number of packets capable of being coalesced is increased from 3 to 31 as throughput is increased by 100 Mbps, that is from 0 Mbps to 100 Mbps. The mapping data to which reference is made in the case of a link capacity of 1 Gbps may be configured so that the maximum number of packets capable of being coalesced is increased from 4 to 8 as throughput is increased by 100 Mbps, that is from 0 Mbps to 100 Mbps. That is, the mapping data may be configured so that a degree of increase of the maximum number of packets capable of being coalesced according to increase of throughput relatively decreases as the link capacity increases.

The mapping data may be configured so that the value of throughput, obtained when the number of packets capable of being coalesced reaches the maximum value, is high when the link capacity is large. For example, in the mapping data to which reference is made in the case of a link capacity of 150 Mbps, the value of throughput obtained when the number of packets capable of being coalesced reaches the maximum value may be 150 Mbps. In the mapping data to which reference is made in the case of a link capacity of 1 Gbps, the value of throughput obtained when the number of packets capable of being coalesced reaches the maximum value may be 1000 Mbps.

In the same manner as the above-description, the processor 520 may select, based on a link capacity, one of a plurality of pieces of mapping data, and may determine the maximum number of packets capable of being coalesced (or a flush time) based on the selected mapping data and measured throughput.

Based on a link capacity, the processor 520 may configure a ratio of a change in measured throughput to a change in the maximum number of coalesced packets to be different. the maximum number of packets to be coalesced, which increases according to increase of measured throughput, is increased at a relatively low rate as a link capacity becomes larger.

For example, the processor 520 may determine the maximum number of packets to be coalesced based on Equation 1 below.

$$f(TP) = a * TP, \quad a = \frac{S_{max}}{C} \quad \text{uation 1}$$

Wherein f(TP): the number of packets to be coalesced, TP: throughput, $S_{max}$: the maximum value of the number of packets to be coalesced, and C: a link capacity.

Referring to Equation 1, the processor 520 may configure the maximum number of packets to be coalesced to be small when a link capacity is large. Alternatively, the processor 520 may configure the maximum number of packets to be coalesced to be high when the link capacity is small. For example, in the case in which the electronic device 101 receives a packet via LTE, the ratio of an increase of throughput to an increase of the number of packets to be coalesced is defined as a first ratio. In the case in which the electronic device 101 receives a packet via NR, the ratio of an increase of throughput to an increase of the number of packets to be coalesced is defined as a second ratio. In this instance, the first ratio may be a higher value than the second ratio.

Equation 1 is merely an example that may be used for determining the number of packets to be coalesced, and the processor 520 may determine the maximum number of packets to be coalesced by using various schemes that configures the maximum number of packets to be coalesced to be small when the link capacity of a link used is large, although throughput measured during an initial period of a session for receiving packets is the same.

The processor 520 may coalesce packets based on the determined maximum number of packets to be coalesced, and may transmit (or flush) the coalesced packets to the network packet processing unit 435.

According to the above-described scheme, the processor 520 may determine the maximum number of packets to be coalesced in consideration of the link capacity of a communication scheme used by the electronic device 101. The processor 520 may configure the maximum number of packets to be coalesced to be relatively small in the situation in which the electronic device 101 is capable of embodying a higher throughput (or in the state of having a large link capacity), and thus may transmit a relatively large number of responses (ack). The external electronic device 104 receives a response relatively frequently, and thus may increase the number of packets to be transmitted to the electronic device 101. Therefore, in the state of receiving a packet via a link having a relatively large link capacity, the electronic device 101 may relatively rapidly increase throughput and may provide a communication service having low latency and/or high reception speed.

The processor 520 may configure the maximum number of packets to be coalesced to be relatively high in the state in which the electronic device 101 is incapable of embodying higher throughput (or the state of having a small link capacity), and thus may decrease power consumed when the network packet processing unit 435 processes packets to be coalesced.

The above-described embodiment may be an embodiment in which the processor 520 determines the number of packets to be coalesced in consideration of a link capacity. However, the disclosure may determine the maximum number of packets to be coalesced based on various types of information in addition to a link capacity.

The processor 520 may identify the maximum throughput of a communication scheme (or link) used for receiving a plurality of packets, while receiving the plurality of packets. The maximum throughput may be the maximum size of data that the electronic device 101 is capable of receiving from the external electronic device 104 during a unit time, and may be a value related to a maximum download speed supportable by a communication scheme. For example, the maximum throughput corresponding to the case in which the electronic device 101 receives a packet via LTE may be lower than the maximum throughput corresponding to the case in which the electronic device 101 receives a packet via NR.

With reference to mapping data including the maximum throughput and network information (e.g., network identification information (e.g., LTE, NR, Wi-Fi), information related to the frequency of a channel (e.g., a frequency, a bandwidth), a signal intensity (e.g., RSRP)) mapped therein and stored in memory (e.g., the memory 130 of FIG. 1), the processor 520 may identify the maximum throughput. For example, the mapping data may be embodied as shown in Table 6 below.

TABLE 6

| Identification information of network | Maximum throughput |
| --- | --- |
| LTE | 100 Mbps |
| NR | 1 Gbps |
| Wi-Fi 6 | 2402 Mbps |

The processor 520 may identify identification information of a network used for packet transmission or reception performed with the external electronic device 104, and may identify the maximum throughput corresponding to the identified identification information with reference to the mapping data.

As a part of an operation of identifying a link capacity, the processor 520 may request information related to a link capacity from a communication processor (e.g., the first communication processor 212 and/or second communication processor 214 of FIG. 2) in a process of establishing a session for receiving a plurality of packets and/or a process of changing a network accessed. Based on link capacity-related information transmitted from the communication processor 212 and 214, the processor 520 may identify a link capacity, and may determine the identified link capacity to be the maximum throughput.

As a part of an operation of identifying a link capacity, the processor 520 may identify a link capacity based on information received from a network (e.g., an aggregate maximum bit rate (AMBR) and/or a maximum flow bit rate (MFBR)) in a process of establishing a session for receiving a plurality of packets and/or a process of changing a network accessed, and may determine the identified link capacity as the maximum throughput.

The processor 520 may determine, as the maximum throughput, the smallest value among the maximum throughput identified based on mapping data stored in the memory 130, the maximum throughput identified based on link capacity-related information transmitted from the communication processor 212 and 214, and/or the maximum throughput identified based on information received from a network, and may determine the maximum number of packets to be coalesced.

The processor 520 may determine the maximum number of packets to be coalesced based on throughput measured during packet reception and the maximum throughput.

Based on the maximum throughput, the processor 520 may configure a ratio of a change in measured throughput to a change in the maximum number of coalesced packets to be different. the maximum number of packets to be coalesced, which increases according to increase of measured throughput, is increased at a relatively low rate as the maximum through becomes higher.

For example, the processor 520 may determine the maximum number of packets to be coalesced based on Equation 2 below.

$$f(TP) = a * TP, \quad a = \frac{S_{max}}{TP_m} \quad \text{tion 2}$$

Wherein f(TP): the maximum number of packets to be coalesced, TP: throughput, $S_{max}$: the maximum value of the number of packets to be coalesced, and $TP_{max}$: link capacity.

Referring to Equation 2, the processor 520 may configure the number of packets to be coalesced to be small when the maximum through is high. Alternatively, the processor 520 may configure the maximum number of packets to be coalesced to be high when the maximum throughput is low. For example, in the case in which the electronic device 101 receives a packet via LTE, the ratio of an increase of throughput to an increase of the maximum number of packets to be coalesced is defined as a first ratio. In the case in which the electronic device 101 receives a packet via NR, the ratio of an increase of throughput to an increase of the maximum number of packets to be coalesced is defined as a second ratio. In this instance, the first ratio may be a higher value than the second ratio.

Equation 2 is merely an example which may be used for determining the number of packets to be coalesced, and the processor 520 may determine the maximum number of packets to be coalesced by using various schemes that configure the maximum number of packets to be coalesced to be low when the maximum throughput is high, and may determine the number of packets to be coalesced to be less than or equal to the maximum number.

The processor 520 may coalesce packets based on the determined maximum number of packets to be coalesced, and may transmit (or flush) the coalesced packets to the network packet processing unit 435.

The processor 520 may identify the maximum throughput of a communication scheme (or link) used for receiving a plurality of packets, while receiving the plurality of packets. The maximum throughput may be the maximum size of data that the electronic device 101 is capable of receiving from the external electronic device 104 during a unit time, and may be a value related to a maximum download speed supportable by a communication scheme. For example, the maximum throughput corresponding to the case in which the electronic device 101 receives a packet via LTE may be lower than the maximum throughput corresponding to the case in which the electronic device 101 receives a packet via NR.

When identifying the maximum throughput, the processor 520 may identify the maximum throughput based on identification information of the network and the state information of the electronic device 101. As a part of an operation of identifying the maximum throughput, the processor 520 may identify the state information of the electronic device 101, and may identify the maximum throughput corresponding to the identified state information with reference to history data stored in the memory 130.

The history data may be data in which the highest throughput among throughput measured when the electronic device 101 is in a predetermined state and a state of the electronic device 101 when the throughput is measured are mapped. For example, the state of the electronic device 101 may include at least one piece of information among identification information of an application that is being executed in the electronic device 101 (or the address of a server accessed via an application), identification information of a communication scheme (e.g., LTE, Wi-Fi, NR) used by the electronic device 101, the location of the electronic device 101 (e.g., identification information of a base station connected to the electronic device 101, information obtained via a GPS sensor of the electronic device 101), the quality of a signal including a packet received by the electronic device 101 (e.g., a signal to noise ratio (SINR), a block error rate (BLER), a channel quality indicator (CQI), a reference signal received power (RSRP), a reference signal received quality (RSRQ)), and/or time information. The history data may be embodied as shown in Table 7 below. The history data may be updated and/or corrected in various manners. For example, the processor 520 may identify the maximum throughput among throughput measured while receiving a plurality of packets transmitted by the external electronic device 104 and may identify the state of the electronic device 101, may map the identified state and the maximum throughput, and may add the same to (or may modify) the history data. A detailed embodiment associated with managing the history data will be described with reference to FIGS. 8A to 8C.

TABLE 7

| State information of electronic device | Maximum throughput |
|---|---|
| Perform application supporting mobile edge computing (MEC) | 2 Gbps |
| Perform communication using NR | 1 Gbps |
| Perform communication at 8 P.M. | 500 Mbps |

The processor 520 may identify the state information of the electronic device 101, and may identify the maximum throughput corresponding to the identified state information with reference to the history data. The processor 520 may determine the maximum number of packets to be coalesced based on measured throughput and the maximum throughput. For example, the processor 520 may identify identification information of an application that is being executed in the electronic device 101, and may identify the maximum throughput corresponding to the identification information based on the history data. The processor 520 may determine the maximum number of packets to be coalesced based on the measured throughput and the maximum throughput, and may determine the number of packets to be coalesced to be less than or equal to the maximum number.

Although the above-described embodiments are described based on the maximum throughput, the maximum throughput is a kind of a representative value, and another value instead of the maximum throughput may be understood as a substitute. For example, the processor 520 may determine the number of packets to be coalesced based on measured throughput value and a representative value.

As a part of an operation of changing the number of packets to be coalesced, the processor 520 may change a flush time, which is a difference between a time at which the processor 520 (or the packet coalescing unit 433 of FIG. 4A) receives a packet to be coalesced and a time at which the processor 520 transmits the packet to be coalesced to a higher layer (e.g., the network packet processing unit 435 (or a network stack)). The processor 520 may increase the number of packets to be coalesced by increasing a flush time, or may decrease the number of packets to be coalesced by decreasing a flush time. The processor 520 may decrease a flush time when a link capacity is large (or when the maximum throughput is high), so as to decrease the number of packets to be coalesced.

Irrespective of a link capacity (or maximum throughput), the processor 520 may determine the maximum number of packets to be coalesced based on the state information of the electronic device 101. The processor 520 may store, in the memory 130, data in which identification information of an application, information associated with a network accessed by an application, and a policy related to the number of packets to be coalesced are mapped. The data may be embodied as shown in Table 8 below.

TABLE 8

| Identification information of application | Information associated with network accessed (or identification information of network slice) and transmission protocol information | Policy related to number of coalesced packets |
|---|---|---|
| First application | Network supporting mobile edge computing (MEC) | Policy 1 (number of packets to be coalesced: 0) |
| Second application | Network supporting URLLC | Policy 1 (number of packets to be coalesced: 0) |
| Third application | Use MEC access and user datagram protocol (UDP) | Policy 2 (number of packets to be coalesced: 46) |

For example, in response to identifying that an application being executed in the electronic device 101 is a predetermined application (e.g., an MEC application), the processor 520 may determine the number of packets to be coalesced based on data in which the identification information of an application, information of a network accessed by an application and a policy related to the number of packets to be coalesced are mapped. In response to identifying that an application being executed in the electronic device 101 is a predetermined application (e.g., an MEC application or an application that uses URLLC), the processor 520 may configure the number of packets to be coalesced to be a designated size (e.g., 0 or 46). As another example, in response to identifying that a service being executed in the electronic device 101 is a designated service (e.g., ultra-reliable and low latency (URLLC)) based on the state information of the electronic device 101, the processor 520 may configure the number of packets to be coalesced to be a designated size (e.g., 0), and may decrease a latency time.

As another example, based on the type of a protocol used by an application that is being executed in the electronic device 101, the processor 520 may determine the number of packets to be coalesced. For example, in response to identifying that a predetermined application provides a service that uses MEC access and/or UDP transmission protocol, the processor 520 may configure the number of packets to be coalesced to be a designated size (0 or 46).

Figure 6:
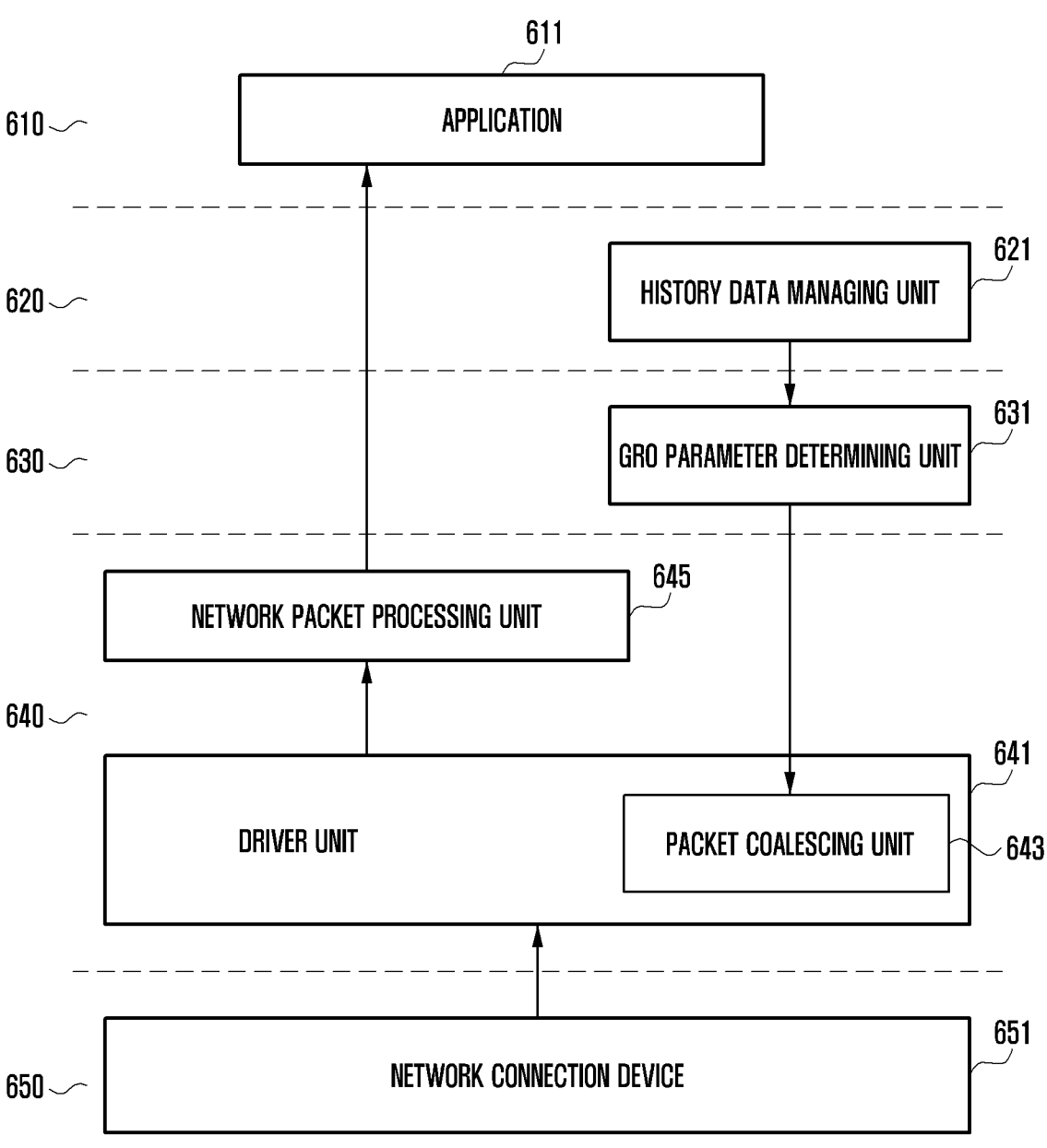
FIG. 6 is a diagram illustrating a structure related to an operation in which an electronic device receives a plurality of packets according to an embodiment of the disclosure.

FIG. 6 is a diagram illustrating a structure related to an operation in which an electronic device receives a plurality of packets according to an embodiment of the disclosure.

Referring to FIG. 6, an electronic device (e.g., the electronic device 101 of FIG. 1) according to various embodiments may include a device area 650 for packet transmission or reception, a kernel area 640, a library area 630, a framework area 620, and/or a user area 610. Operations operable in the kernel area 640, the library area 630, the framework area 620, and/or the user area 610 may be executable by a processor (e.g., the processor 520 of FIG. 5). A detailed description of components that are identical or similar to the components illustrated in FIG. 4A among the components illustrated in FIG. 6 will be omitted for clarity of the description.

The processor 120 may perform operations and functions in the kernel area 430 and the user area 450 by implementing software 400 (e.g., the program 140 of FIG. 1). Instructions related to the functions may be stored in memory (e.g., the memory 130 of FIG. 1).

According to various embodiments, the device area 650 may include a hardware device for transmitting or receiving a packet. The device area 650 may include a network connection device 651 (e.g., a network interface controller (NIC)) or a modem. The network connection device 651 may be a hardware device for converting a packet to be transferred by the electronic device 101 via a network into a signal or a bitstream, and physically transmitting or receiving the same. A packet may include a data packet that a transmission end is to transfer to a reception end.

According to various embodiments, the processor (e.g., the processor 520 of FIG. 5) may receive a packet via the network connection device 651 (e.g., the communication circuit 510 of FIG. 5), and may transmit a packet via the network connection device 651. Via the network connection device 651, the processor 520 may transmit a packet to an external electronic device (e.g., the electronic device 102 or 104 of FIG. 1, or a server (e.g., the server 108 of FIG. 1)), and may receive a packet transmitted from an external electronic device or a server.

According to various embodiments, the kernel area (kernel layer) 640 may be included in an operating system (OS) (e.g., the operating system 142 of FIG. 1) of the electronic device. The kernel area (kernel layer) 640 may provide a function for controlling packet processing. The kernel area 640 may include various entities for processing a received packet. The kernel area 640 may include a driver unit 641, a packet coalescing unit 643, and a network packet processing unit 645.

The device driver unit 641 may process a received packet so that the received packet is processible in a higher layer. The device driver unit 641 may process a packet to be appropriate for an operating system that currently operates in the electronic device 101. The driver unit 641 may be embodied in a form of including the packet coalescing unit 643, and may be embodied separately from the packet coalescing unit 643.

According to various embodiments, the packet coalescing unit 643 may perform a packet coalescing function. The packet coalescing unit 643 may transfer received packets to a higher layer (e.g., the network packet processing unit 645). The packet coalescing unit 433 may coalesce received packets and may transmit the same.

The packet coalescing function is a scheme that coalesces (or binds) consecutive packet data having the same IP/TCP header information (or packet data received via the same session) into a single packet when the network device driver performs packet reception, and transfers the coalesced packets to the network packet processing unit 645.

The packet coalescing unit 643 may coalesce received packets, and may transfer the same to a higher layer at the same time, thereby reducing the load of the network packet processing unit 645.

According to various embodiments, the network packet processing unit 645 may process a packet received from the packet coalescing unit 643. The network packet processing unit 645 may include a network stack. The network packet processing unit 645 may include a network layer (e.g., an internet protocol (IP) or an internet control message protocol (ICMP)) and a transport layer (a transmission control protocol (TCP) or a user datagram protocol (UDP)). The network packet processing unit 645 may receive a packet from the network connection device 411 via the packet coalescing unit 643. The network packet processing unit 645 may process a received packet so that the received packet is processible in the user area 610, and may transfer the processed packet to the user area 610.

According to various embodiments, in the user area (user layer) 610, operations that use packets transferred from the kernel area 640 may be performed. In the user area (user layer) 610, the transferred packets may be used appropriately for the purpose of applications 611 that operate in the user layer.

According to various embodiments, the applications 611 may operate in an operating system (e.g., the operating system 142 of FIG. 1) for controlling resources related to the electronic device and/or an operating system.

The framework area 620 and the library area 630 may provide a function required by the applications 611 in common, or may provide various functions to the applications 611 to enable the applications 611 to use the limited system resources within the electronic device 101. At least some entities of the entities included in the library area 630 may be embodied in the framework area 620.

A history data managing unit 621 may be embodied in the framework area 620 and/or library area 630, and may detect (or monitor) a state of the electronic device 101, and may map the state of the electronic device 101 and throughput having the maximum value among throughput measured during packet reception, so as to produce and/or manage history data. The history data may be data in which the highest throughput among throughput measured when the electronic device 101 is in a predetermined state and the state of the electronic device 101 when the throughput is measured are mapped. For example, the state of the electronic device 101 may include at least one piece of information among identification information of an application that is being executed in the electronic device 101 (or the address of a server accessed via an application), identification information of a communication scheme (e.g., LTE, Wi-Fi, NR) used by the electronic device 101, the location of the electronic device 101 (e.g., identification information of a base station connected to the electronic device 101, information obtained via a GPS sensor of the electronic device 101), the quality of a signal including a packet received by the electronic device 101 (e.g., a channel quality indicator (CQI), a reference signals received power (RSRP)), and/or time information.

A GRO parameter determining unit 631 may be embodied in the library area 630, and may determine the number of packets to be coalesced based on the maximum throughput transmitted by the history data managing unit 621 and measured throughput. The GRO parameter determining unit 631 may transmit the determined number to the packet coalescing unit 643 via an interface (not illustrated) embodied in the kernel area 640. Based on the number of packets to be coalesced, which is transmitted by the GRO parameter determining unit 631, the packet coalescing unit 643 may coalesce some packets among a plurality of packets received from the network connection device 651, and may transmit the coalesced packets to the network packet processing unit 654.

Figure 7A:
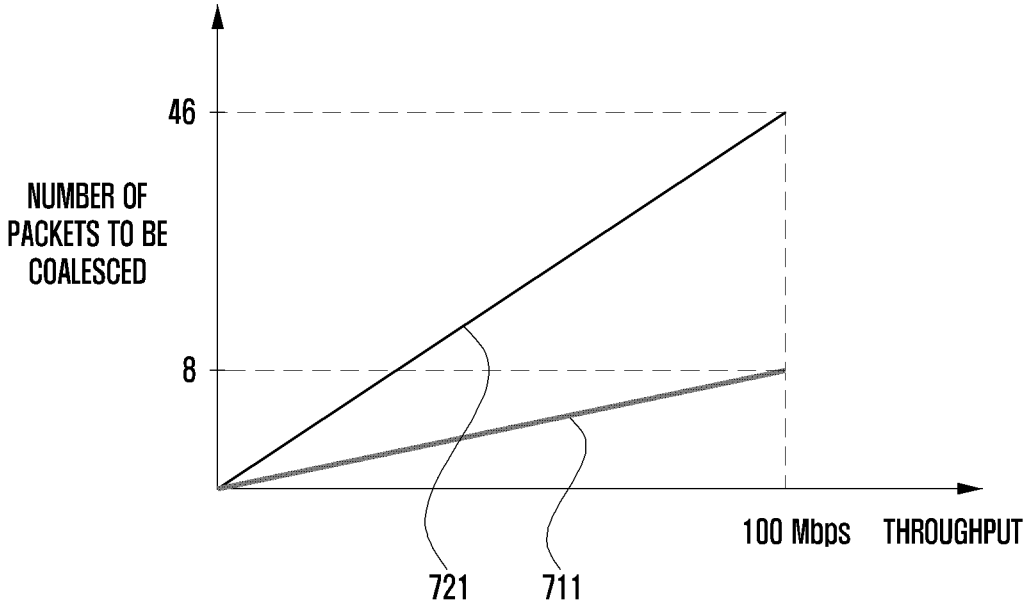
FIG. 7A is a graph illustrating the number of packets to be coalesced, which is determined in consideration of a link capacity, in an electronic device according to an embodiment of the disclosure.

FIG. 7A is a graph illustrating the number of packets to be coalesced, which is determined in consideration of a link capacity, in an electronic device according to an embodiment of the disclosure.

Referring to FIG. 7A, there is a graph illustrating the number of packets to be coalesced according to increase of throughput.

It is assumed that an electronic device (e.g., the electronic device 101 of FIG. 1) determines the number of packets to be coalesced with reference to the mapping data listed in Table 1, and the electronic device 101 transmits or receives a packet via wireless communication using long term evolution (LTE). As shown in line 711, the electronic device 101 may increase the number of packets to be coalesced in the state in which measured throughput is increased. The maximum throughout that the electronic device 101, which supports LTE, is capable of embodying via LTE may be approximately 100 Mbps. When throughput measured in the state in which the electronic device 101 receives a packet is similar to the maximum throughput, the electronic device 101 may coalesce eight packets and may transmit (or flush) the coalesced packets to a network stack (e.g., the network packet processing unit 435 of FIG. 4A). In this instance, although it is incapable of increasing throughput any longer, the electronic device 101 configures the number of coalesced packets (e.g., 8) to be lower than the maximum number of the packets capable of being coalesced (e.g., 46), and thus the electronic device 101 may fail to reduce the amount of power consumed for packet processing, which could be achieved by increasing the number of coalesced packets.

When determining the number of packets to be coalesced, the electronic device 101 according to various embodiments of the disclosure may determine the maximum number of packets to be coalesced based on a link capacity (or the maximum throughput) and measured throughput. Based on the link capacity, the electronic device 101 may configure a ratio of a change in measured throughput to a change in the maximum number of coalesced packets to be different. When the link capacity (or maximum throughput) of a link used is large, the electronic device 101 may configure the maximum number of packets to be coalesced to be low although the measured throughput is the same. the maximum number of packets to be coalesced, which increases according to increase of measured throughput, is increased at a relatively low rate as a link capacity becomes larger. Therefore, the electronic device 101 may increase TCP responsivity so as to embody a rapid increase of throughput. The electronic device 101 may configure the maximum number of packets to be coalesced to be relatively high when a link capacity is relatively small.

It is assumed that the electronic device 101 determines the number of packets to be coalesced with reference to mapping data illustrated in Table 2 (or mapping data produced based on a link capacity), and the electronic device 101 transmits or receives a packet via wireless communication using long term evolution (LTE). As shown in line 721, the electronic device 101 may increase the number of packets to be coalesced in the state in which measured throughput is increased. When compared to the comparative example 711, the electronic device 101 may have a relatively high increase rate of the number of packets to be coalesced. The maximum throughout that the electronic device 101, which supports LTE, is capable of embodying via LTE may be approximately 100 Mbps. When throughput measured in the state in which the electronic device 101 receives a packet is similar to the maximum throughput, the electronic device 101 may coalesce 46 packets and may transmit (or flush) the coalesced packets to a network stack (e.g., the network packet processing unit 645 of FIG. 6). Therefore, in the case in which the electronic device 101 receives a packet via a communication scheme having a relatively small link capacity, the electronic device 101 may rapidly increase the number of packets to be coalesced and may reduce the amount of power to be consumed when the network packet processing unit 645 processes packets to be coalesced.

Figure 7B:
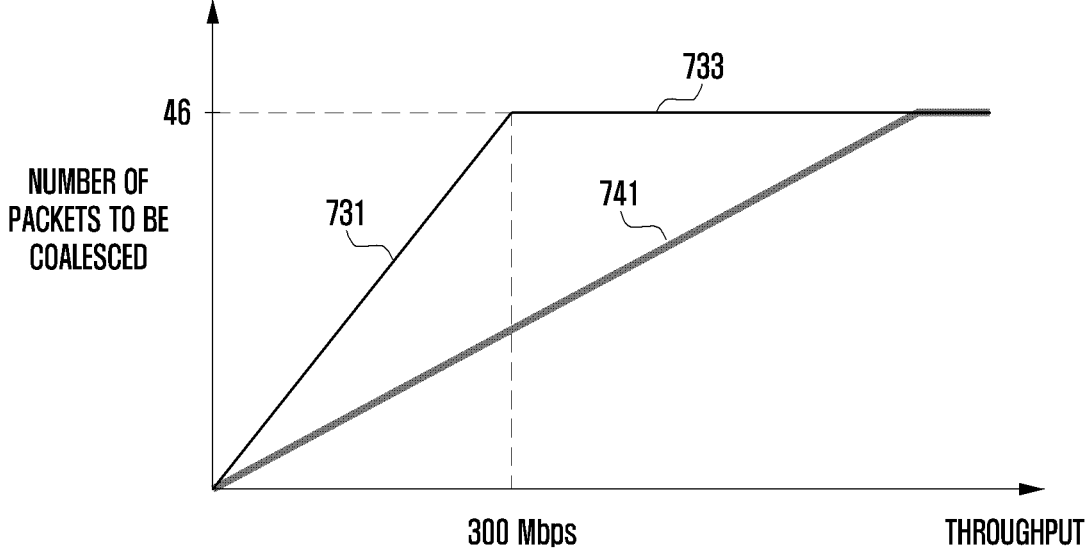
FIG. 7B is a graph illustrating the number of packets to be coalesced, which is determined in consideration of a link capacity, in an electronic device according to an embodiment of the disclosure.

FIG. 7B is a graph illustrating the number of packets to be coalesced, which is determined in consideration of a link capacity, in an electronic device according to an embodiment of the disclosure.

It is assumed that an electronic device (e.g., the electronic device 101 of FIG. 1) determines the number of packets to be coalesced with reference to the mapping data listed in Table 1, and the electronic device 101 transmits or receives a packet via wireless communication using new radio (NR).

As shown in line 731, the electronic device 101 may increase the number of packets to be coalesced in the state in which measured throughput is increased. Based on identifying that measured throughput is greater than or equal to (or exceed) a designated value (e.g., 300 Mbps), the electronic device 101 may configure the number of packets to be coalesced to be the maximum value (e.g., 46). As shown in line 733, in the case in which the measured throughput is greater than or equal to the designated value, the electronic device 101 may maintain the number of packets to be coalesced as the maximum value. The electronic device 101 may coalesce 46 packets, and may transmit (or flush) the coalesced packets to a network stack (e.g., the network packet processing unit 435 of FIG. 4A).

In this instance, the maximum throughput that the electronic device 101, which supports NR, is capable of embodying via wireless communication may be approximately 1 Gbps. Although when the throughput is capable of being further increased in the state in which the throughput (e.g., 300 Mbps) measured by the electronic device 101 is smaller than the maximum throughput, the electronic device 101 may configure the number of packets to be coalesced to be the maximum value. When the electronic device 101 configures the number of packets to coalesce to be the maximum value in the situation in which throughput is capable of being further increased, and the electronic device 101 may transmit a smaller number of responses (ack) than responses (ack) transmitted in the situation in which the number of packets to coalesce is relatively small, and thus may relatively slowly increase the throughput.

It is assumed that the electronic device 101 determines the number of packets to be coalesced with reference to mapping data illustrated in Table 2 (or mapping data produced based on a link capacity), and the electronic device 101 transmits or receives a packet via wireless communication using new radio (NR). As shown in line 741, the electronic device 101 may increase the number of packets to be coalesced in the state in which measured throughput is increased. When compared to the comparative example 731, the electronic device 101 may have a relatively low increase rate of the number of packets to be coalesced. The maximum throughput that the electronic device 101, which supports NR, is capable of embodying via NR may be approximately 1 Gbps. The electronic device 101 may configure the number of packets to be coalesced to be relatively small in the situation in which the electronic device 101 is capable of embodying higher throughput (or in the state of having a large link capacity), and thus may transmit a relatively large number of responses (ack). The external electronic device 104 receives a response relatively frequently, and thus may increase the number of packets to be transmitted to the electronic device 101. Therefore, in the state of receiving a packet via a link having a relatively large link capacity, the electronic device 101 may relatively rapidly increase throughput and may provide a communication service having low latency and/or high reception speed.

Figure 7C:
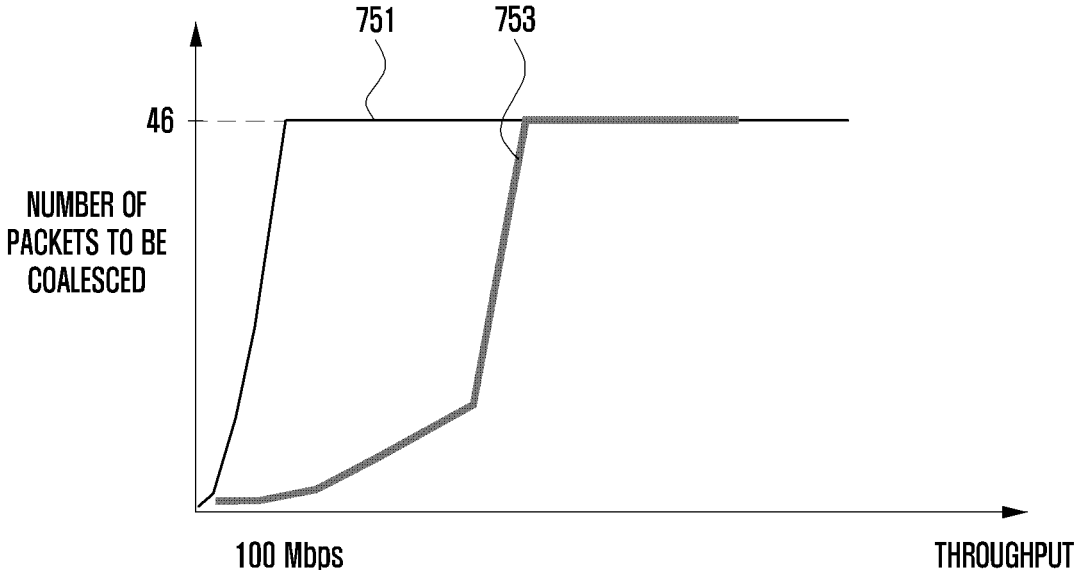
FIG. 7C is a graph illustrating the maximum number of coalesced packets, which is determined using mapping data different based on a link capacity, in an electronic device according to an embodiment of the disclosure.

FIG. 7C is a graph illustrating the maximum number of coalesced packets, which is determined using mapping data different based on a link capacity, in an electronic device according to an embodiment of the disclosure.

In order to determine the maximum number of packets to be coalesced, the electronic device 101 may refer to mapping data 751 and 753 stored in the memory 130. The mapping data may be data in which the throughput of data and the maximum number of packets capable of being coalesced are mapped. The mapping data may be embodied differently depending on a link capacity. For example, the memory 130 may store mapping data 751 to which reference may be made in the case of a link capacity of 150 Mbps (e.g., LTE) and mapping data 753 to which reference may be made in the case of a link capacity of 1.5 Gbps.

The mapping data may be configured so that a degree of increase of the maximum number of packets capable of being coalesced according to increase of throughput is relatively decreased as the link capacity is increased.

Referring to FIG. 7C, the electronic device 101 may identify a link capacity (e.g., 150 Mbps), and may select the mapping data 751 among mapping data 751 and 753 based on the link capacity. The electronic device 101 may determine the maximum size of packets capable of being coalesced based on the selected mapping data 751 and measured throughput. Alternatively, the electronic device 101 may identify a link capacity (e.g., 1 Gbps), and may select mapping data 753 among mapping data 751 and 753 based on the link capacity. The electronic device 101 may determine the maximum number of packets capable of being coalesced based on the selected mapping data 753 and measured throughput.

Referring to mapping data of FIG. 7C, the relationship between the maximum number of packets capable of being coalesced and the increase of throughput may be embodied in the form of a function (e.g., $n^{th}$ degree polynomial) as opposed to a degree 1 polynomial (or a linear function).

For example, the mapping data may be embodied as shown in Equation 3 below.

$$f(TP) = \begin{cases} \min(s_{max}, a * TP^2) & \text{if } TP \le TP_{threshold} \\ s_{max} & \text{if } TP > TP_{threshold}, \end{cases} \quad a = \frac{s_{max}}{TP_{max}^2} \text{erein } f(TP):$$

the number of packets to be coalesced, TP: throughput, $S_{max}$: the maximum value of the number of packets to be coalesced, and $TP_{max}$: a link capacity.

Referring to Equation 3, based on the fact that a measured throughput value is less than or equal to (or less than) a predetermined throughput $(TP_{threshold})$, the electronic device 101 may configure the maximum value of the number of packets capable of being coalesced to be increased when the measured throughput value is increased. Based on the fact that the measured throughput value exceeds (or is greater or equal to) a predetermined throughput $(TP_{threshold})$, the electronic device 101 may maintain a designated value (e.g., 46) as the maximum value of the number of packets capable of being coalesced.

Figure 8A:
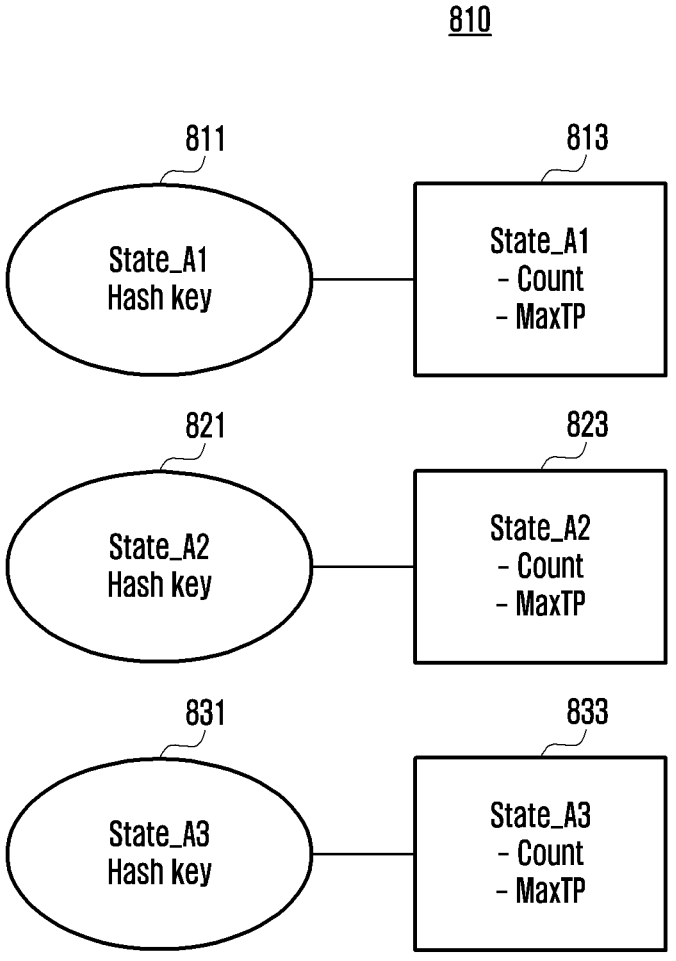
FIG. 8A is a diagram illustrating history data managed by an electronic device according to an embodiment of the disclosure.

FIG. 8A is a diagram illustrating history data managed by an electronic device according to an embodiment of the disclosure.

Referring to FIG. 8A, an electronic device (e.g., the electronic device 101 of FIG. 5) may monitor a state of the electronic device 101, and may identify throughput associated with reception of a packet transmitted from an external electronic device (e.g., the electronic device 104 of FIG. 1) while performing monitoring. The electronic device 101 may produce and/or manage history data by mapping the state of the electronic device 101 and throughput having the maximum value among the throughput measured during packet reception.

The state of the electronic device 101 may include at least one piece of information among identification information of an application that is being executed in the electronic device 101 (or the address of a server accessed via an application), identification information of a communication scheme (e.g., LTE, Wi-Fi, NR) used by the electronic device 101, the location of the electronic device 101 (e.g., identification information of a base station connected to the electronic device 101, information obtained via a GPS sensor of the electronic device 101), the quality of a signal including a packet received by the electronic device 101 (e.g., a channel quality indicator (CQI), a reference signals received power (RSRP)), and/or time information.

The electronic device 101 may identify the maximum throughput by configuring a value produced based on the state of history data as an index, and identifying throughput corresponding to an index that corresponds to the state of the electronic device 101 among a plurality of indices. As a part of an operation of configuring an index, the electronic device 101 may configure, as an index, a hash key obtained by inputting state information of the electronic device 101 to a designated hash function.

Referring to FIG. 8A, the history data 810 may be data in which hash keys 811, 821, and 831 produced based on the state information of the electronic device 101 and values 813, 823, and 833 related to the state information of the electronic device 101 are mapped.

The value related to the state information of the electronic device 101 may include the maximum throughput corresponding to the state of the electronic device 101 and the number of times that the state of the electronic device 101 corresponding to the hash key 811, 821, and 831 occurs. The number of times that the state of the electronic device 101 occurs is a value for managing history data, and a detailed embodiment in which the electronic device 101 manages history data based on the number will be described with reference to FIG. 8C.

Figure 8B:
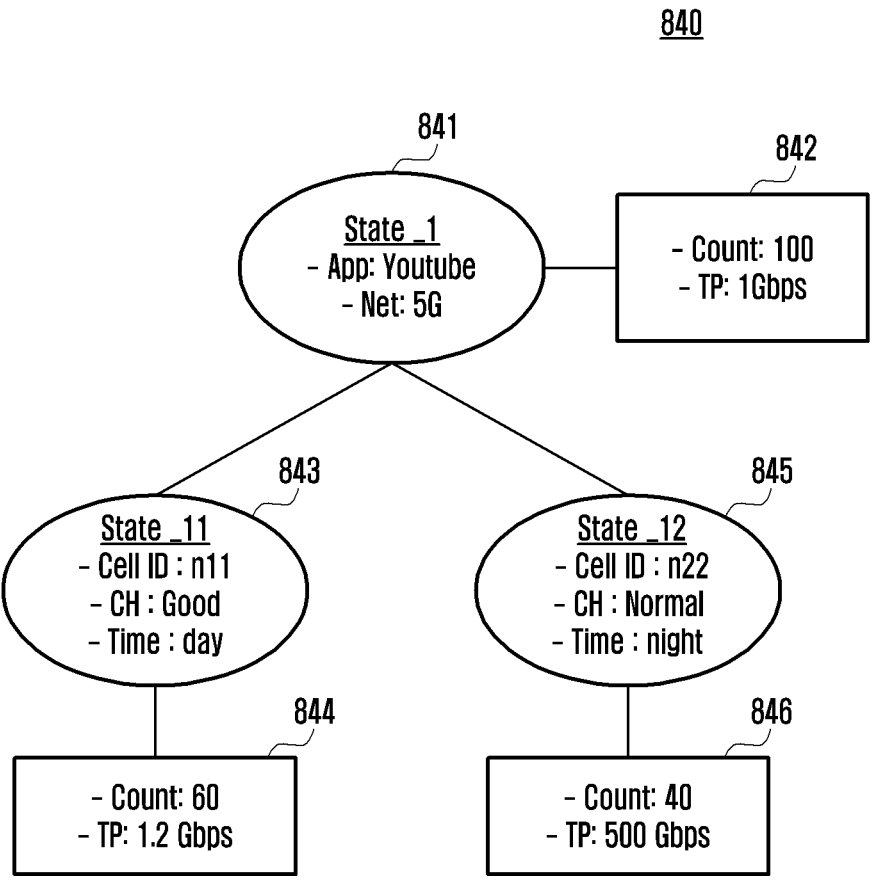
FIG. 8B is a diagram illustrating history data managed by an electronic device according to an embodiment of the disclosure.

FIG. 8B is a diagram illustrating history data managed by an electronic device according to an embodiment of the disclosure.

Referring to FIG. 8B, an electronic device (e.g., the electronic device 101 of FIG. 5) may monitor the state of the electronic device 101, and may identify throughput associated with reception of a packet transmitted from an external electronic device (e.g., the electronic device 104 of FIG. 1) while performing monitoring. The electronic device 101 may produce and/or manage history data by mapping the state of the electronic device 101 and throughput having the maximum value among the throughput measured during packet reception.

The state of the electronic device 101 may include at least one piece of information among identification information of an application that is being executed in the electronic device 101 (or the address of a server accessed via an application), identification information of a communication scheme (e.g., LTE, Wi-Fi, NR) used by the electronic device 101, the location of the electronic device 101 (e.g., identification information of a base station connected to the electronic device 101, information obtained via a GPS sensor of the electronic device 101), the quality of a signal including a packet received by the electronic device 101 (e.g., a channel quality indicator (CQI), a reference signals received power (RSRP)), and/or time information.

The electronic device 101 may produce and manage the history data 840 in a tree format. The history data 840 may stratify the state information of the electronic device 101 based on the number of times that the state of the electronic device 101 occurs, and may produce the history data 840 in a tree format based on the stratified state information of the electronic device 101. The state information 841 of the electronic device 101 in a higher layer may include the state information 843 and 845 of the electronic device 101 in a lower layer.

Referring to FIG. 8B, the lower layer state information 843 and 845 may be subordinate to the higher layer state information 841. The lower layer state information 843 may further include additional state information (e.g., connected to base station n11, having a good channel condition, and used during the daytime) in addition to the state information (e.g., executing a predetermined application and connected to an NR network) of the electronic device 101 included in the higher layer state information 841. The lower layer state information 845 may further include additional state information (e.g., connected to base station n22, having an ordinary channel condition, and used during the evening) in addition to the state information (e.g., executing a predetermined application and connected to an NR network) of the electronic device 101 included in the higher layer state information 841.

Referring to FIG. 8B, the history data 810 may be data in which the state information 841, 843, and 845 of the electronic device 101 and values 842, 844, and 846 related to the state information of the electronic device 101 are mapped.

The value related to the state information of the electronic device 101 may include the maximum throughput corresponding to the state information 841, 843, and 845 of the electronic device 101 and the number of times that the state of the electronic device 101 occurs. The number of times that the state of the electronic device 101 occurs is a value for managing history data, and a detailed embodiment in which the electronic device 101 manages history data based on the number will be described with reference to FIG. 8C.

Figure 8C:
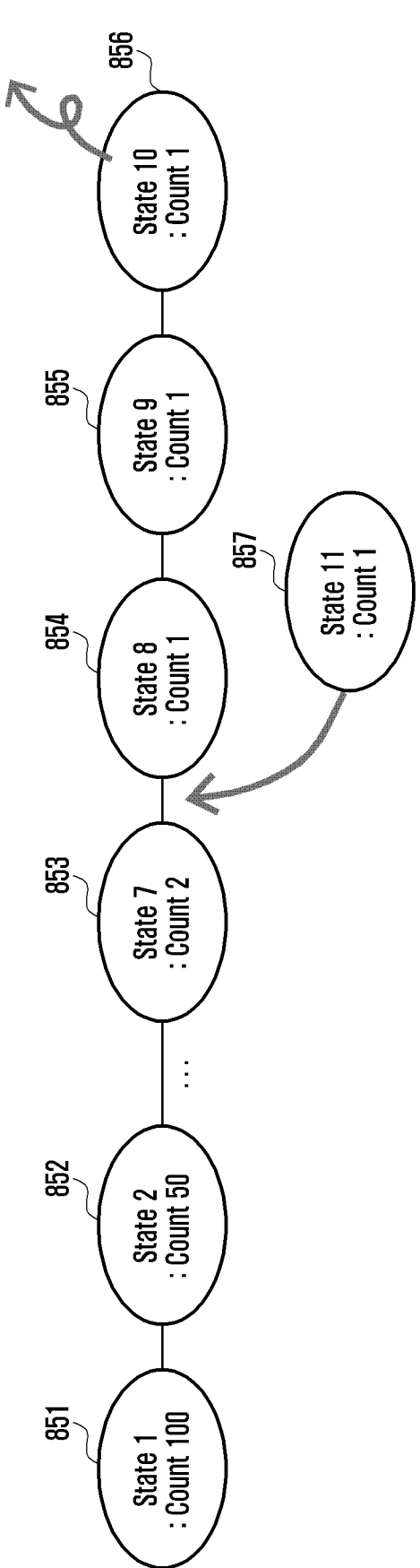
FIG. 8C is a diagram illustrating history data managed by an electronic device according to an embodiment of the disclosure.

FIG. 8C is a diagram illustrating history data managed by an electronic device according to an embodiment of the disclosure.

The electronic device (e.g., the electronic device 101 of FIG. 5) may identify the state of the electronic device 101 and the maximum throughput among throughput measured while receiving a plurality of packets transmitted from an external electronic device (e.g., the electronic device 104 of FIG. 5), and may map the identified state and the maximum throughput and may add the same to (or may modify) the history data.

The history data 850 may include state information 851, 852, 853, 854, 855, and 856 of the electronic device 101 arranged sequentially based on the number of times that the state of the electronic device 101 occurs. The electronic device 101 may delete some of the existing state information 851, 852, 853, 854, 855, and 856 and may add new state information 857, when adding the new state information 857 of the electronic device 101 to the history data 850.

To select state information to be deleted from the existing state information 851, 852, 853, 854, 855, and 856, the electronic device 101 may take into consideration the number of times that the state of the electronic device 101 occurs. For example, the electronic device 101 may determine to delete some of the state information 854, 855, and 856 corresponding to states of the electronic device 101 that occur the smallest number of times among the existing state information 851, 852, 853, 854, 855, and 856. In the case in which multiple pieces of state information 854, 855, and 856 are to be deleted, the electronic device 101 may delete the oldest state information 856 among the state information 854, 855, and 856 to be deleted and may add new state information 857 to the history data 850.

An electronic device according to various embodiments of the disclosure may include memory storing mapping data in which the maximum number of packets capable of being coalesced based on throughput of data is differently mapped based on a link capacity of a link used for receiving the data, a communication circuit, and a processor, and the processor may be configured to perform receiving a plurality of packets via the communication circuit, identifying a link capacity of a link used for receiving the plurality of packets, selecting mapping data corresponding to the identified link capacity among the mapping data, determining the maximum number of packets to be coalesced among the plurality of packets based on throughput measured while receiving the plurality of packets and the selected mapping data, and transmitting, to a network stack, the packets coalesced based on the determined number.

In the electronic device according to various embodiments of the disclosure, the mapping data may be configured so that a degree of increase in the maximum number of packets capable of being coalesced according to increase of the throughput is relatively decreased as the link capacity is increased.

In the electronic device according to various embodiments of the disclosure, the mapping data may be configured so that a value of throughput when the number of packets capable of being coalesced reaches the maximum value becomes higher as the link capacity increases.

In the electronic device according to various embodiments of the disclosure, the processor may be configured to identify the link capacity based on information related to the link capacity transmitted by a communication processor of the electronic device.

In the electronic device according to various embodiments of the disclosure, the electronic device may be configured to identify a state of the electronic device and throughput related to reception of the plurality of packets while receiving the plurality of packets, and to store, in memory, history data in which the identified state of the electronic device and the throughput are mapped.

In the electronic device according to various embodiments of the disclosure, the processor may be configured to identify throughput that is mapped to a state of the electronic device with reference to the history data, before determining the maximum number of packets to be coalesced, and to determine the maximum number of packets to be coalesced based on the identified throughput and the measured throughput.

In the electronic device according to various embodiments of the disclosure, the state information of the electronic device may include information associated with an application being executed in the electronic device and location information of the electronic device while the electronic device receives the plurality of packets.

In the electronic device according to various embodiments of the disclosure, the processor may be configured to identify the throughput corresponding to the application being executed, upon reception of a packet related to the application being executed in the electronic device, and to determine the maximum number of packets to be coalesced based on the identified throughput and the measured throughput.

In the electronic device according to various embodiments of the disclosure, the processor may be configured to increase, based on a first ratio, the maximum number of packets to be coalesced as increase of the throughput in a state of receiving a packet via a network having a relatively large link capacity, and to increase, based on a second ratio, the maximum number of packets to be coalesced according to increase of the throughput in a state of receiving a packet via a network having a relatively small link capacity, and the magnitude of the first ratio may be smaller than the magnitude of the second ratio.

In the electronic device according to various embodiments of the disclosure, the processor may be configured to determine the maximum number of packets to be coalesced among the plurality of packets based on throughput measured while receiving the plurality of packets and the maximum throughput corresponding to a state of the electronic device.

In the electronic device according to various embodiments of the disclosure, the processor may be configured to determine the maximum throughput based on information associated with a network used by the electronic device and/or an intensity of a signal transmitted by the network.

In the electronic device according to various embodiments of the disclosure, the processor may be configured to change the maximum value of a flush time, which is a difference between a time at which the processor receives packets to be coalesced and a time at which the processor transmits the packets to be coalesced to the network stack, as a part of an operation of changing the maximum number of packets to be coalesced.

In the electronic device according to various embodiments of the disclosure, the processor may be configured to decrease the maximum value as the link capacity increases.

Figure 9:
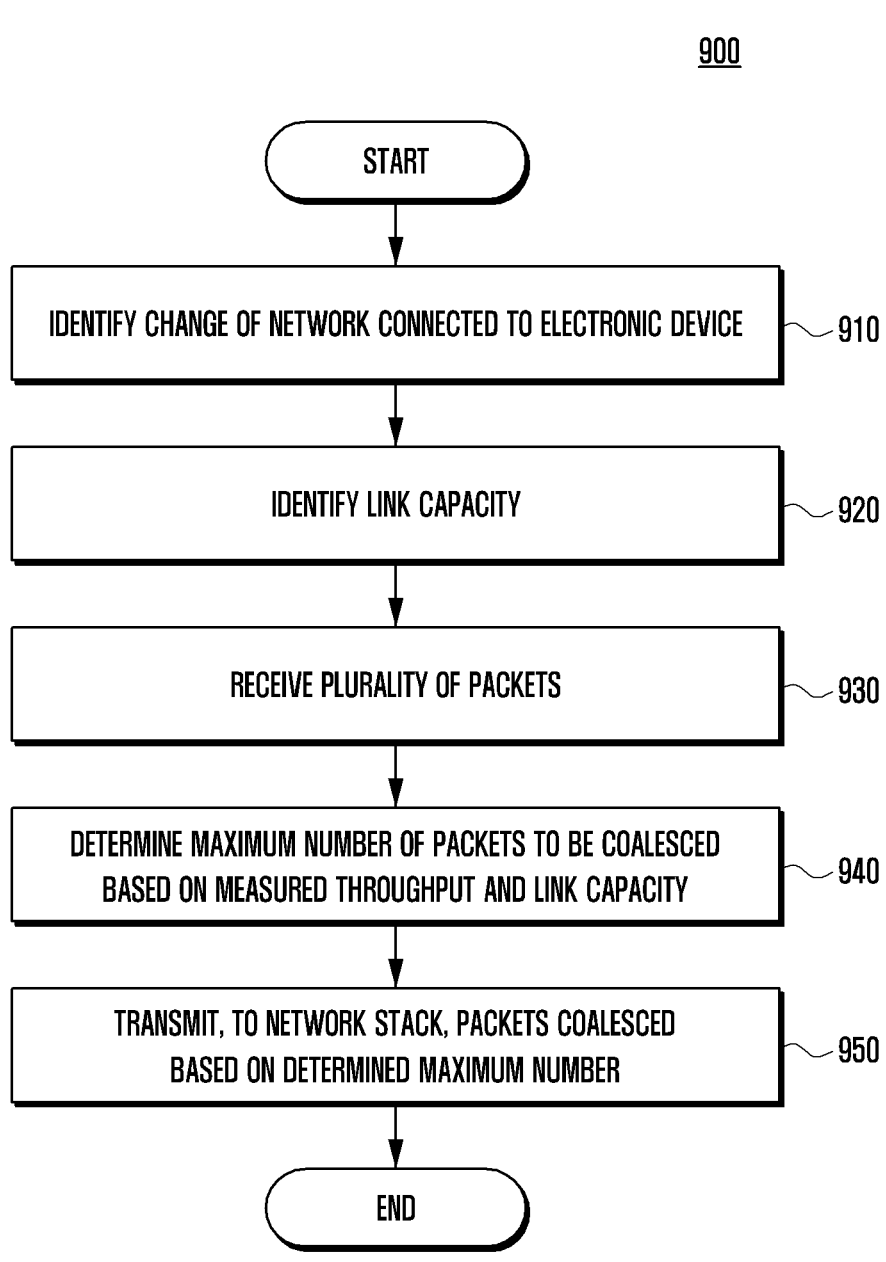
FIG. 9 is a flowchart illustrating an operation method of an electronic device according to an embodiment of the disclosure.

FIG. 9 is a flowchart illustrating an operation method 900 of an electronic device according to an embodiment of the disclosure.

An electronic device (e.g., the electronic device 101 of FIG. 5) may detect a change of a network connected to the electronic device 101 in operation 910.

The change of the network may include a change of the network type of the network connected to the electronic device 101. According to an embodiment, the connection of electronic device 101 may be switched from a short-range wireless communication to cellular communication. Alternatively, the electronic device 101 may detect a change of connection from first cellular communication, and a connection to second cellular communication which is different from the first cellular communication, and may perform operation 920.

The change of the network may include a change of the frequency band of the network. According to an embodiment, in the state in which the electronic device 101 is connected to a network via a first frequency band (e.g., FR1 that is a frequency band less than or equal to 6 GHZ), if the electronic device 101 is connected to the network via a second frequency band (e.g., FR2 that is a frequency band greater than or equal to 6 GHZ) different from the first frequency, the electronic device 101 may detect a change of the network.

The change of the network may include a change in the intensity of a signal transmitted by the network. According to an embodiment, the change in the intensity of a signal transmitted by the network may be caused by mobility of the electronic device 101.

The electronic device 101 may identify a link capacity of the network connected in operation 920.

The link capacity may be the maximum capacity capable of performing transmission (or reception) via a link established for packet transmission and/or reception between the electronic device 101 and the external electronic device 104. The link capacity may be a value associated with the maximum throughput of a communication scheme used by the electronic device 101 for packet reception. The link capacity may be larger as the maximum throughput of a communication scheme used by the electronic device 101 for packet reception is higher. The link capacity may be smaller as the maximum throughput of a communication scheme used by the electronic device 101 for packet reception is lower. For example, a link capacity corresponding to the case in which the electronic device 101 receives a packet via LTE may be smaller than a link capacity corresponding to the case in which the electronic device 101 receives a packet via NR. The processor 520 may identify the maximum throughput of a link (or wireless communication) to which the electronic device 101 is currently connected, instead of a link capacity.

With reference to mapping data including a link capacity and network information (e.g., network identification information (e.g., LTE, NR, Wi-Fi), information related to the frequency of a channel (e.g., a frequency, a bandwidth), a signal intensity (e.g., RSRP)) mapped therein and stored in memory (e.g., the memory 530 of FIG. 5), the electronic device 101 may identify a link capacity.

The electronic device 101 may identify a link capacity based on information (e.g., characteristics of a network, characteristics of the electronic device 101) included in mapping data. The characteristics of the network may include at least some among identification information of the network, a frequency band, a bandwidth, the quality of a signal, a BLER, and a CQI.

The electronic device 101 may identify a link capacity based on mapping data and at least some of the characteristics of the network (e.g., identification information of a network, a frequency band, a bandwidth, the quality of a signal, a BLER, and a CQI) identified in operation 910.

As a part of an operation of identifying a link capacity, the electronic device 101 may request information related to a link capacity from a communication processor (e.g., the first communication processor 212 and/or the second communication processor 214 of FIG. 2). Based on link capacity-related information transmitted from the communication processor 212 and 214, the electronic device 101 may identify a link capacity.

In operation 930, the electronic device 101 may receive a plurality of packets from an external electronic device (e.g., the electronic device 104 of FIG. 1).

The electronic device 101 may perform a series of operations of establishing a session for performing transmission and/or reception of various packets with the external electronic device 104 A session may be a physical or logical connection for packet transmission and/or reception between the electronic device 101 and the external electronic device 104. The session between the electronic device 101 and the external electronic device 104 may be produced via various schemes (e.g., TCP, UDP) not limited by the disclosure. The electronic device 101 may control the communication circuit 510 for various operations for establishing a session.

Upon completion of session establishment, the electronic device 101 may control the communication circuit 510 so as to transmit a packet to the external electronic device 104, or to receive a packet transmitted from the external electronic device 104. The electronic device 101 may measure (or monitor) throughput associated with packet reception while receiving a packet transmitted from the external electronic device 104.

In operation 940, the electronic device 101 may determine the number of packets to be coalesced based on the measured throughput and the link capacity.

In order to determine the maximum number of packets to be coalesced, the electronic device 101 may refer to the mapping data 751 and 753 stored in the memory 130. The mapping data may be data in which the throughput of data and the maximum number of packets capable of being coalesced are mapped. The mapping data may be embodied differently depending on a link capacity. For example, the memory 130 may store mapping data to which reference may be made in the case of a link capacity of 150 Mbps (e.g., LTE) and mapping data to which reference may be made in the case of a link capacity of 1.5 Gbps (e.g., NR).

The mapping data may be configured so that a degree of increase of the maximum number of packets capable of being coalesced according to increase of throughput is relatively decreased as the link capacity is increased.

The mapping data may be configured so that the value of throughput, obtained when the number of packets capable of being coalesced reaches the maximum value, is increased as the link capacity is increased.

The electronic device 101 may select, based on a link capacity, one of a plurality of pieces of mapping data, and may determine the maximum number (or a flush time) of packets capable of being coalesced based on the selected mapping data and measured throughput.

In operation 950, the electronic device 101 may transmit packets coalesced based on the determined number to a network stack (e.g., the network packet processing unit 645 of FIG. 6).

The electronic device 101 may coalesce packets based on the determined number of packets to be coalesced, and may transmit (or flush) the coalesced packets to the network packet processing unit 435.

According to the above-described scheme, the electronic device 101 may determine the maximum number of packets to be coalesced in consideration of the link capacity of a communication scheme used by the electronic device 101. The electronic device 101 may configure the maximum number of packets to be coalesced to be relatively small in the situation in which the electronic device 101 is capable of embodying higher throughput (or in the state of having a large link capacity), and thus may transmit a relatively large number of responses (ack). The external electronic device 104 receives a response relatively frequently, and thus may increase the number of packets to be transmitted to the electronic device 101. Therefore, in the state of receiving a packet via a link having a relatively large link capacity, the electronic device 101 may relatively rapidly increase throughput and may provide a communication service having low latency and/or high reception speed.

The electronic device 101 may configure the maximum number of packets to be coalesced to be relatively high in the state in which the electronic device 101 is incapable of embodying higher throughput (or in the state of having a small link capacity), and thus may decrease power consumed when the network packet processing unit 435 processes packets to be coalesced.

Above-described embodiment is an embodiment in which the electronic device 101 determines the number of packets to be coalesced in consideration of a link capacity. However, the disclosure may determine the maximum number of packets to be coalesced based on various types of information (e.g., the maximum throughput, the state information of the electronic device 101) in addition to the link capacity.

Figure 10:
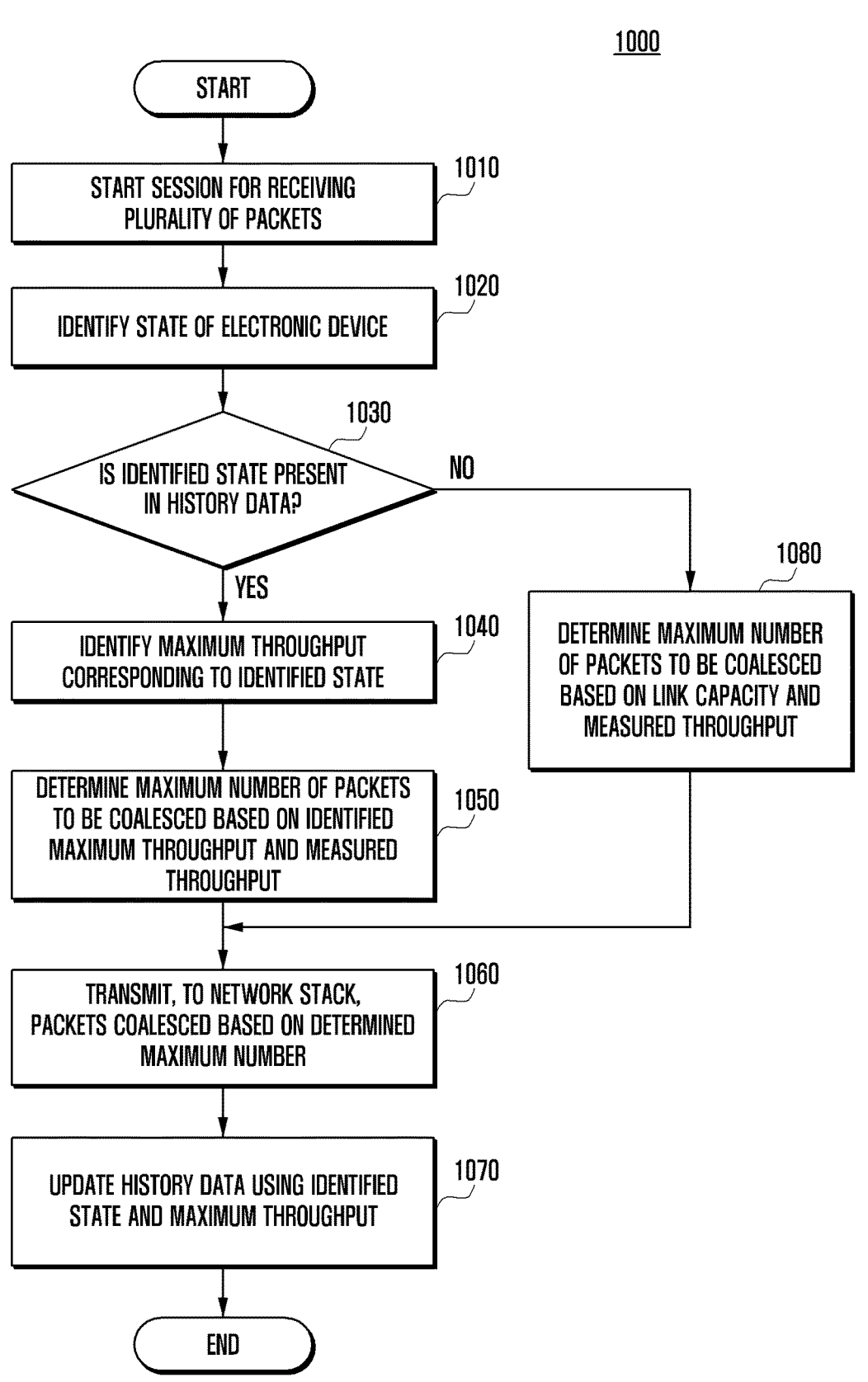
FIG. 10 is a flowchart illustrating an operation method of an electronic device according to an embodiment of the disclosure.

FIG. 10 is a flowchart illustrating an operation method 1000 of an electronic device according to an embodiment of the disclosure.

An electronic device (e.g., the electronic device 101 of FIG. 5) may start a session for receiving a plurality of packets in operation 1010.

The electronic device 101 may perform a series of operations of establishing a session for performing transmission and/or reception of various packets with the external electronic device 104 A session may be a physical or logical connection for packet transmission and/or reception between the electronic device 101 and the external electronic device 104. The session between the electronic device 101 and the external electronic device 104 may be produced via various schemes (e.g., TCP, UDP) not limited by the disclosure. The electronic device 101 may control the communication circuit 510 for various operations for establishing a session.

In operation 1020, the electronic device 101 may identify a state of the electronic device 101 while receiving the plurality of packets.

The state of the electronic device 101 may include at least one piece of information among identification information of an application that is being executed in the electronic device 101 (or the address of a server accessed via an application), identification information of a communication scheme (e.g., LTE, Wi-Fi, NR) used by the electronic device 101, the location of the electronic device 101 (e.g., identification information of a base station connected to the electronic device 101, information obtained via a GPS sensor of the electronic device 101), the quality of a signal including a packet received by the electronic device 101 (e.g., a channel quality indicator (CQI), a reference signals received power (RSRP), and/or time information.

In operation 1030, the electronic device 101 may identify whether the identified state is present in history data.

The history data may be data in which the highest throughput among throughput measured when the electronic device 101 is in a predetermined state and the state of the electronic device 101 when the throughput is measured are mapped.

In operation 1040, upon identifying that the identified state is present in the history data in operation 1030-Y, the electronic device 101 may identify the maximum throughput corresponding to the identified state based on the history data.

The processor 520 may identify the state information of the electronic device 101, and may identify the maximum throughput corresponding to the identified state information with reference to the history data.

In operation 1050, the electronic device 101 may determine the number of packets to be coalesced based on the identified maximum throughput and measured throughput.

The electronic device 101 may determine the number of packets to be coalesced based on the measured throughput and the maximum throughput. For example, the electronic device 101 may identify identification information of an application that is being executed in the electronic device 101, and may identify the maximum throughput corresponding to the identification information based on the history data. The electronic device 101 may determine the number of packets to be coalesced based on the measured throughput and the maximum throughput.

Although the above-described embodiments are described based on the maximum throughput, the maximum throughput is a kind of a representative value, and another value instead of the maximum throughput may be understood as a substitute. For example, the electronic device 101 may determine the number of packets to be coalesced based on measured throughput value and a representative value.

In operation 1060, the electronic device 101 may transmit packets coalesced based on the determined number to a network stack (e.g., the network packet processing unit 645 of FIG. 6).

The electronic device 101 may coalesce packets based on the determined number of packets to be coalesced, and may transmit (or flush) the coalesced packets to the network packet processing unit 435.

In operation 1070, the electronic device 101 may update history data by using the state identified in operation 1020 and the maximum throughput among throughput measured while receiving packets.

Upon identifying that the identified state is not present in the history data in operation 1030-N, the electronic device 101 may determine the number of packets to be coalesced based on a link capacity and the measured throughput in operation 1080.

The link capacity may be the maximum capacity capable of performing transmission (or reception) via a link established for packet transmission and/or reception between the electronic device 101 and the external electronic device 104. The link capacity may be a value associated with the maximum throughput of a communication scheme used by the electronic device 101 for packet reception. The link capacity may be larger as the maximum throughput of a communication scheme used by the electronic device 101 for packet reception is higher. Based on the link capacity, the electronic device 101 may configure a ratio of a change in measured throughput to a change in the number of coalesced packets to be different. the maximum number of packets to be coalesced, which increases according to increase of measured throughput, is increased at a relatively low ratio as a link capacity becomes larger.

After determining the number of packets to be coalesced, the electronic device 101 may perform operation illustrated in operation 1060 and operation 1070.

An operation method of an electronic device according to various embodiments of the disclosure may include an operation of receiving a plurality of packets, an operation of identifying a link capacity of a link used for receiving the plurality of packets, an operation of selecting mapping data corresponding to the identified link capacity among mapping data in which the maximum number of packets capable of being coalesced based on throughput of data is differently mapped based on a link capacity of a link used for receiving data, an operation of determining the maximum number of packets to be coalesced among the plurality of packets based on throughput measured while receiving the plurality of packets and the selected mapping data, and an operation of transmitting, to a network stack, the packets coalesced based on the determined number.

In the operation method of the electronic device according to various embodiments of the disclosure, the mapping data may be configured so that a degree of increase of the maximum number of packets capable of being coalesced according to increase of the throughput is relatively decreased as the link capacity is increased.

In the operation method of the electronic device according to various embodiments of the disclosure, the mapping data may be configured so that a value of throughput when the number of packets capable of being coalesced reaches the maximum value becomes higher as the link capacity increases.

In the operation method of the electronic device according to various embodiments of the disclosure, the operation of identifying the link capacity may include an operation of identifying a link capacity based on information related to the link capacity transmitted by a communication processor of the electronic device.

The operation method of the electronic device according to various embodiments of the disclosure may further include an operation of identifying a state of the electronic device and throughput related to reception of the plurality of packets while receiving the plurality of packets, and an operation of storing, in memory, history data in which the identified state of the electronic device and the throughput are mapped.

The operation method of the electronic device according to various embodiments of the disclosure may further include an operation of identifying throughput that is mapped to a state of the electronic device with reference to the history data, before determining the maximum number of packets to be coalesced, and an operation of determining the maximum number of packets to be coalesced based on the identified throughput and the measured throughput.

In the operation method of the electronic device according to various embodiments of the disclosure, the state information of the electronic device may include information associated with an application being executed in the electronic device and location information of the electronic device while the electronic device receives the plurality of packets.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
memory storing mapping data in which a degree of increase in a number of packets capable of being coalesced according to increase in throughput of data decreases as a link capacity of a link used for receiving data increases, the memory further storing one or more computer programs;
a communication circuit; and
one or more processors communicatively coupled to the memory and the communication circuit,
wherein the one or more computer programs include computer-executable instructions that, when executed by the one or more processors individually or collectively, cause the electronic device to:
receive a plurality of packets via a link,
identify a link capacity of the link used for receiving the plurality of packets,
select mapping data corresponding to the identified link capacity among the mapping data,
based on measured throughput of the link and the selected mapping data, determine the number of packets to be coalesced among the plurality of packets, and
transmit, to a network stack, the plurality of the packets coalesced according to the determined number.

2. The electronic device of claim 1, wherein the mapping data is configured so that a value of throughput when the number of packets capable of being coalesced reaches a maximum value becomes higher as the link capacity increases.

3. The electronic device of claim 1, wherein the one or more computer programs further include computer-executable instructions that, when executed by the one or more processors individually or collectively, cause the electronic device to identify the link capacity based on information related to the link capacity transmitted by a communication processor of the electronic device.

4. The electronic device of claim 1, wherein the one or more computer programs further include computer-executable instructions that, when executed by the one or more processors individually or collectively, cause the electronic device to:

identify a state of the electronic device and throughput related to reception of the plurality of packets while receiving the plurality of packets; and store, in the memory, history data in which the identified state of the electronic device and the throughput are mapped.

5. The electronic device of claim 4, wherein the one or more computer programs further include computer-executable instructions that, when executed by the one or more processors individually or collectively, cause the electronic device to:

identify throughput that is mapped to a state of the electronic device with reference to the history data, before determining the number of packets to be coalesced; and determine the number of packets to be coalesced, based on the identified throughput and the measured throughput.

6. The electronic device of claim 4, wherein information of the identified state of the electronic device comprises information associated with an application being executed in the electronic device and location information of the electronic device while the electronic device receives the plurality of packets.

7. The electronic device of claim 4, wherein the one or more computer programs further include computer-executable instructions that, when executed by the one or more processors individually or collectively, cause the electronic device to:

identify the throughput corresponding to an application being executed, upon reception of a packet related to the application being executed in the electronic device; and determine the number of packets to be coalesced, based on the identified throughput and the measured throughput.

8. The electronic device of claim 1, wherein the one or more computer programs further include computer-executable instructions that, when executed by the one or more processors individually or collectively, cause the electronic device to:

increase, based on a first ratio, the number of packets to be coalesced according to increase of the throughput in a state of receiving a packet via a network having a relatively large link capacity, and increase, based on a second ratio, the number of packets to be coalesced according to increase of the throughput in a state of receiving a packet via a network having a relatively small link capacity, and wherein a magnitude of the first ratio is smaller than a magnitude of the second ratio.

9. The electronic device of claim 1, wherein the one or more computer programs further include computer-executable instructions that, when executed by the one or more processors individually or collectively, cause the electronic device to determine the number of packets to be coalesced among the plurality of packets based on throughput measured while receiving the plurality of packets and a maximum throughput corresponding to a state of the electronic device.

10. The electronic device of claim 9, wherein the one or more computer programs further include computer-executable instructions that, when executed by the one or more processors individually or collectively, cause the electronic device to determine the maximum throughput based on information associated with a network used by the electronic device and/or an intensity of a signal transmitted by the network.

11. The electronic device of claim 1, wherein the one or more computer programs further include computer-executable instructions that, when executed by the one or more processors individually or collectively, cause the electronic device to change a maximum value of a flush time, which is a difference between a time at which the one or more processors individually or collectively receive packets to be coalesced and a time at which the one or more processors individually or collectively transmit the packets to be coalesced to the network stack, as a part of an operation of changing a maximum number of packets to be coalesced.

12. The electronic device of claim 11, wherein the one or more computer programs further include computer-executable instructions that, when executed by the one or more processors individually or collectively, cause the electronic device to decrease the maximum value as the link capacity increases.

13. A method performed by an electronic device, the method comprising:

receiving a plurality of packets via a link;

identifying a link capacity of the link used for receiving the plurality of packets;

selecting mapping data corresponding to the identified link capacity among mapping data;

based on measured throughput of the link and the selected mapping data in which a degree of increase in a number of packets capable of being coalesced according to increase in throughput of data decreases as a link capacity of a link used for receiving data increases, determining the number of packets to be coalesced among the plurality of packets; and transmitting, to a network stack, the packets coalesced based on the determined number.

14. The method of claim 13, wherein the mapping data is configured so that a value of throughput when the number of packets capable of being coalesced reaches a maximum value becomes higher as the link capacity increases.

15. The method of claim 13, further comprising identifying the link capacity based on information related to the link capacity transmitted by a communication processor of the electronic device.

16. The method of claim 13, further comprising:

identifying a state of the electronic device and throughput related to reception of the plurality of packets while receiving the plurality of packets; and storing, in memory, history data in which the identified state of the electronic device and the throughput are mapped.

17. One or more non-transitory computer-readable storage media storing one or more computer programs including computer-executable instructions that, when executed by one or more processors of an electronic device individually or collectively, cause the electronic device to perform operations, the operations comprising:

receiving a plurality of packets via a link;

identifying a link capacity of the link used for receiving the plurality of packets;

selecting mapping data corresponding to the identified link capacity among mapping data;

based on measured throughput of the link and the selected mapping data in which a degree of increase in a maximum number of packets capable of being coalesced according to increase in throughput of data decreases as a link capacity of a link used for receiving data increases, determining a maximum number of packets to be coalesced among the plurality of packets; and transmitting, to a network stack, the packets coalesced 5 based on the determined number.

18. The one or more non-transitory computer-readable storage media of claim 17, wherein the mapping data is configured so that a degree of increase of the maximum number of packets capable of being coalesced according to 10 increase of the throughput relatively decreases as the link capacity increases.

\* \* \* \* \*